US008463673B2

(12) United States Patent
Koll et al.

(10) Patent No.: US 8,463,673 B2
(45) Date of Patent: Jun. 11, 2013

(54) USER FEEDBACK IN SEMI-AUTOMATIC QUESTION ANSWERING SYSTEMS

(75) Inventors: Detlef Koll, Pittsburgh, PA (US); Thomas Polzin, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 81 days.

(21) Appl. No.: 13/242,532

(22) Filed: Sep. 23, 2011

(65) Prior Publication Data

US 2012/0078763 A1 Mar. 29, 2012

Related U.S. Application Data

(60) Provisional application No. 61/385,838, filed on Sep. 23, 2010.

(51) Int. Cl.
*G07F 19/00* (2006.01)
*G06Q 50/00* (2006.01)
*G06F 17/27* (2006.01)
*G10L 11/00* (2006.01)

(52) U.S. Cl.
USPC ........... 705/34; 705/2; 705/3; 704/9; 704/270

(58) Field of Classification Search
None
See application file for complete search history.

(56) References Cited

U.S. PATENT DOCUMENTS 5,933,809 A 8/1999 Hunt et al.
6,182,029 B1 * 1/2001 Friedman .......................... 704/9
6,292,771 B1 9/2001 Haug et al.
6,655,583 B2 12/2003 Walsh et al.
7,233,938 B2 6/2007 Carus et al.
7,290,016 B2 10/2007 Byers
7,447,988 B2 11/2008 Ross
7,454,393 B2 11/2008 Horvitz et al.
7,467,094 B2 12/2008 Rosenfeld et al.
7,516,113 B2 4/2009 Horvitz et al.
7,584,103 B2 9/2009 Fritsch et al.
7,610,192 B1 10/2009 Jamieson
7,716,040 B2 5/2010 Koll et al.

(Continued)

FOREIGN PATENT DOCUMENTS

EP 0687987 A1 12/1995
WO 2011/100474 A2 8/2011
WO 2011/100474 A3 1/2012

OTHER PUBLICATIONS

Heinze, Daniel T., et al., "LIFECODE: A Deployed Application for Automated Medical Coding", AI Magazine, Articles, vol. 22, No. 02, 2001, pp. 76-88.

(Continued)

*Primary Examiner* — Mussa A Shaawat
(74) *Attorney, Agent, or Firm* — Robert Plotkin, P.C.

(57) ABSTRACT

A system applies rules to a set of documents to generate codes, such as billing codes for use in medical billing. A human operator provides input specifying whether the generated codes are correct. Based on the input from the human operator, the system attempts to identify which clause(s) in the rules which were relied on to generate the particular code are correct and which such clause(s) are incorrect. The system then assigns praise to components of the system responsible for generating codes in the correct clauses, and assigns blame to components of the system responsible for generating codes in the incorrect clauses. Such blame and praise may then be used to determine whether particular code-generating components are insufficiently reliable. The system may disable, or take other remedial action in response to, insufficiently reliable code-generating components.

20 Claims, 9 Drawing Sheets

U.S. PATENT DOCUMENTS

| | | | | |
|---|---|---|---|---|
| 2002/0016529 | A1 | 2/2002 | Iliff | |
| 2002/0049628 | A1 | 4/2002 | West et al. | |
| 2003/0069877 | A1 | 4/2003 | Grefenstette et al. | |
| 2003/0105638 | A1 | 6/2003 | Taira | |
| 2004/0078236 | A1 * | 4/2004 | Stoodley et al. | 705/2 |
| 2004/0172297 | A1 | 9/2004 | Rao et al. | |
| 2004/0176979 | A1 | 9/2004 | Gottlieb et al. | |
| 2005/0137910 | A1 | 6/2005 | Rao et al. | |
| 2005/0240439 | A1 | 10/2005 | Covit et al. | |
| 2005/0251422 | A1 | 11/2005 | Wolfman et al. | |
| 2007/0013968 | A1 * | 1/2007 | Ebaugh et al. | 358/448 |
| 2007/0050187 | A1 | 3/2007 | Cox | |
| 2007/0088564 | A1 | 4/2007 | March, Jr. et al. | |
| 2008/0005064 | A1 | 1/2008 | Sarukkai | |
| 2008/0134038 | A1 | 6/2008 | Oh et al. | |
| 2009/0055168 | A1 | 2/2009 | Wu et al. | |
| 2009/0193267 | A1 * | 7/2009 | Chung | 713/193 |
| 2009/0287678 | A1 | 11/2009 | Brown et al. | |
| 2010/0036680 | A1 | 2/2010 | Familant | |
| 2012/0041950 | A1 | 2/2012 | Koll et al. | |
| 2012/0096036 | A1 * | 4/2012 | Ebaugh et al. | 707/780 |

OTHER PUBLICATIONS

International Search Report received for International Patent Application No. PCT/US2011/024405, mailed on Nov. 28, 2011, 3 pages.

International Search Report and Written Opinion received for International Patent Application No. PCT/US2011/052983, mailed on Apr. 25, 2012, 8 pages.

* cited by examiner

USER FEEDBACK IN SEMI-AUTOMATIC QUESTION ANSWERING SYSTEMS

CROSS REFERENCE TO RELATED APPLICATIONS

This application claims priority from commonly-owned U.S. Prov. Pat. App. 61/385,838, filed on Sep. 23, 2010, entitled, "User Feedback in Semi-Automatic Question Answering Systems" which is hereby incorporated by reference herein.

This application is related to co-pending and commonly-owned U.S. patent application Ser. No. 13/025,051, filed on Feb. 10, 2011, entitled, "Providing Computable Guidance to Relevant Evidence in Question-Answering Systems" which is hereby incorporated by reference herein.

BACKGROUND

There are a variety of situations in which a human operator has to answer a set of discrete questions given a corpus of documents containing information pertaining to the questions. One example of such a situation is that in which a human operator is tasked with associating billing codes with a hospital stay of a patient, based on a collection of all documents containing information about the patient's hospital stay. Such documents may, for example, contain information about the medical procedures that were performed on the patient during the stay and other billable activities performed by hospital staff in connection with the patient during the stay.

This set of documents may be viewed as a corpus of evidence for the billing codes that need to be generated and provided to an insurer for reimbursement. The task of the human operator, a billing coding expert in this example, is to derive a set of billing codes that are justified by the given corpus of documents, considering applicable rules and regulations. Mapping the content of the documents to a set of billing codes is a demanding cognitive task. It may involve, for example, reading reports of surgeries performed on the patient and determining not only which surgeries were performed, but also identifying the personnel who participated in such surgeries, and the type and quantity of materials used in such surgeries (e.g., the number of stents inserted into the patient's arteries), since such information may influence the billing codes that need to be generated to obtain appropriate reimbursement. Such information may not be presented within the documents in a format that matches the requirements of the billing code system. As a result, the human operator may need to carefully examine the document corpus to extract such information.

Because of such difficulties inherent in generating billing codes based on a document corpus, various computer-based support systems have been developed to guide human coders through the process of deciding which billing codes to generate based on the available evidence. Despite such guidance, it can still be difficult for the human coder to identify the information necessary to answer each question.

To address this problem, the above-referenced patent application entitled, "Providing Computable Guidance to Relevant Evidence in Question-Answering Systems" (U.S. patent application Ser. No. 13/025,051) discloses various techniques for pointing the human coder to specific regions within the document corpus that may contain evidence of the answers to particular questions. The human coder may then focus initially or solely on those regions to generate answers, thereby generating such answers more quickly than if it were necessary to review the entire document corpus manually.

The answers may themselves take the form of billing codes or may be used, individually or in combination with each other, to select billing codes.

For example, an automated inference engine may be used to generate billing codes automatically based on the document corpus and possibly also based on answers generated manually and/or automatically. The conclusions drawn by such an inference engine may, however, not be correct. What is needed, therefore, are techniques for improving the accuracy of billing codes and other data generated by automated inference engines.

SUMMARY

A system applies rules to a set of documents to generate codes, such as billing codes for use in medical billing. A human operator provides input specifying whether the generated codes are correct. Based on the input from the human operator, the system attempts to identify which clause(s) in the rules which were relied on to generate the particular code are correct and which such clause(s) are incorrect. The system then assigns praise to components of the system responsible for generating codes in the correct clauses, and assigns blame to components of the system responsible for generating codes in the incorrect clauses. Such blame and praise may then be used to determine whether particular code-generating components are insufficiently reliable. The system may disable, or take other remedial action in response to, insufficiently reliable code-generating components.

DETAILED DESCRIPTION

Embodiments of the present invention may be used to improve the quality of computer-based components that are used to identify concepts within documents, such as components that identify concepts within speech and that encode such concepts in codes (e.g., XML tags) within transcriptions of such speech. Such codes are referred to herein as "concept codes" to distinguish them from other kinds of codes. One example of a system for performing such encoding of concepts within concept codes is disclosed in U.S. Pat. No. 7,584,103, entitled, "Automated Extraction of Semantic Content and Generation of a Structured Document from Speech," which is hereby incorporated by reference herein. Embodiments of the present invention may generate transcripts of speech and encode concepts represented by such speech within concept codes in those transcripts using, for example, any of the techniques disclosed in U.S. Pat. No. 7,584,103.

Figure 1A:
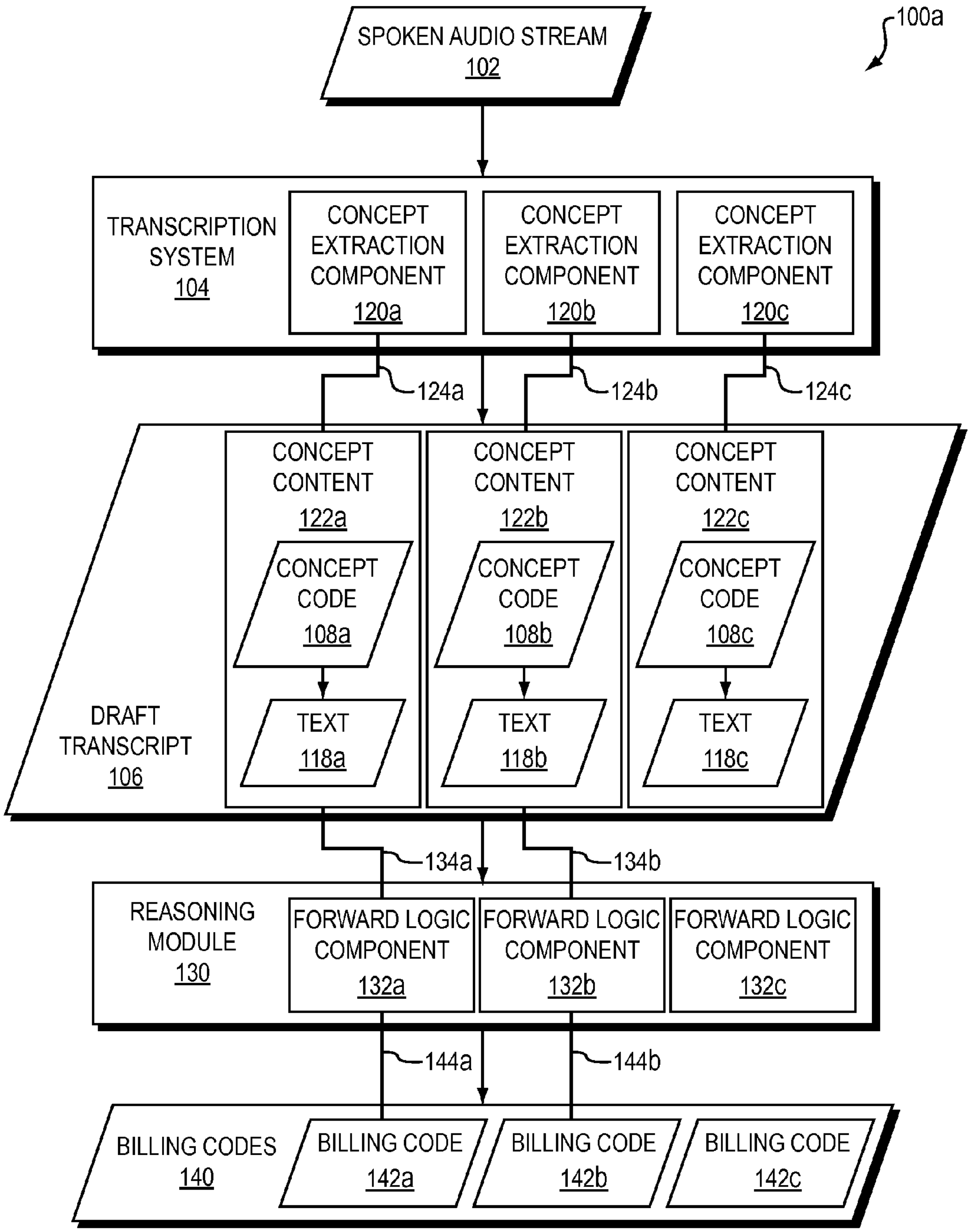
FIG. 1A is a dataflow diagram of a system for extracting concepts from speech and for encoding such concepts within codes according to one embodiment of the present invention.
Figure 2:
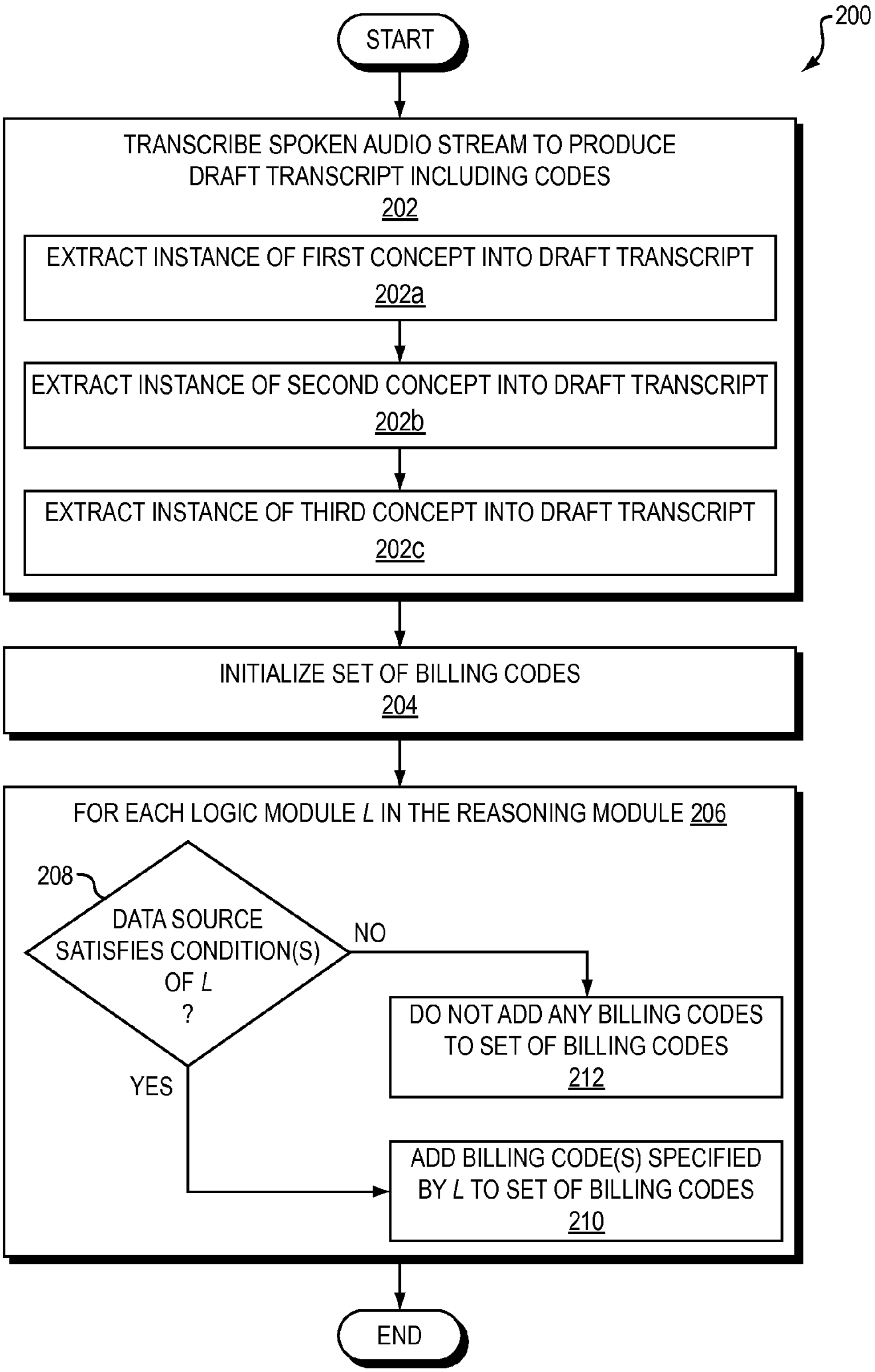
FIG. 2 is a flowchart of a method performed by the system of FIG. 1A according to one embodiment of the present invention.

For example, by way of high-level overview, FIG. 1A is a dataflow diagram of a system 100*a* for extracting concepts from speech and for encoding such concepts within concept codes according to one embodiment of the present invention. FIG. 2 is a flowchart of a method 200 performed by the system 100*a* of FIG. 1A according to one embodiment of the present invention.

A transcription system 104 transcribes a spoken audio stream 102 to produce a draft transcript 106 (operation 202). The spoken audio stream 102 may, for example, be dictation by a doctor describing a patient visit. The spoken audio stream 102 may take any form. For example, it may be a live audio stream received directly or indirectly (such as over a telephone or IP connection), or an audio stream recorded on any medium and in any format.

The transcription system 104 may produce the draft transcript 106 using, for example, an automated speech recognizer or a combination of an automated speech recognizer and a physician or other human reviewer. The transcription system 104 may, for example, produce the draft transcript 106 using any of the techniques disclosed in the above-referenced U.S. Pat. No. 7,584,103. As described therein, the draft transcript 106 may include text that is either a literal (verbatim) transcript or a non-literal transcript of the spoken audio stream 102. As further described therein, although the draft transcript 106 may include or solely contain plain text, the draft transcript 106 may also, for example, additionally or alternatively contain structured content, such as XML tags which delineate document sections and other kinds of document structure. Various standards exist for encoding structured documents, and for annotating parts of the structured text with discrete facts (data) that are in some way related to the structured text. Examples of existing techniques for encoding medical documents include the HL7 CDA v2 XML standard (ANSI-approved since May 2005), SNOMED CT, LOINC, CPT, ICD-9 and ICD-10, and UMLS.

As shown in FIG. 1A, the draft transcript 106 includes one or more concept codes 108*a-c*, each of which encodes an instance of a "concept" extracted from the spoken audio stream 102. The term "concept" is used herein as defined in U.S. Pat. No. 7,584,103. Reference numeral 108 is used herein to refer generally to all of the concept codes 108*a-c* within the draft transcript 106. Although in FIG. 1A only three concept codes 108*a-c* are shown, the draft transcript 106 may include any number of codes. In the context of a medical report, each of the codes 108 may, for example, encode an allergy, prescription, diagnosis, or prognosis. Although the draft transcript 106 is shown in FIG. 1A as only containing text that has corresponding codes, the draft transcript 106 may also include unencoded text (i.e., text without any corresponding codes), also referred to as "plain text."

Codes 108 may encode instances of concepts represented by corresponding text in the draft transcript 106. For example, in FIG. 1A, concept code 108*a* encodes an instance of a concept represented by corresponding text 118*a*, concept code 108*b* encodes an instance of a concept represented by corresponding text 118*b*, and concept code 108*c* encodes an instance of a concept represented by corresponding text 118*c*. Although each unit of text 118*a-c* is shown as disjoint in FIG. 1A, any two or more of the texts 118*a-c* may overlap with and/or contain each other. The correspondence between a code and its corresponding text may be stored in the system 100*a*, such as by storing each of the concept codes 108*a-c* as one or more tags (e.g., XML tags) that mark up the corresponding text. For example, concept code 108*a* may be implemented as a pair of tags within the transcript 106 that delimits the corresponding text 118*a*, concept code 108*b* may be implemented as a pair of tags within the transcript 106 that delimits the corresponding text 118*b*, and concept code 108*c* may be implemented as a pair of tags within the transcript 106 that delimits the corresponding text 118*c*.

Transcription system 104 may include components for extracting instances of discrete concepts from the spoken audio stream 102 and for encoding such concepts into the draft transcript 106. For example, assume that first concept extraction component 120*a* extracts instances of a first concept from the audio stream 102, that the second concept extraction component 120*b* extracts instances of a second concept from the audio stream 102, and that the third concept extraction component 120*c* extracts instances of a third concept from the audio stream 102. As a result, the first concept extraction component 120*a* may extract an instance of the first concept from a first portion of the audio stream 102 (FIG. 2, operation 202*a*); the second concept extraction component 120*b* may extract an instance of the second concept from a second portion of the audio stream 102 (FIG. 2, operation 202*b*); and the third concept extraction component 120*c* may extract an instance of the third concept from a third portion of the audio stream 102 (FIG. 2, operation 202*c*).

The concept extraction components 120*a-c* may use natural language processing (NLP) techniques to extract instances of concepts from the spoken audio stream 102. The concept extraction components 120*a-c* may, therefore, also be referred to herein as "natural language processing (NLP) components."

The first, second, and third concepts may differ from each other. As just one example, the first concept may be a "date" concept, the second concept may be a "medications" concept, and the third concept may be an "allergies" concept. As a result, the concept extractions performed by operations 202*a*, 202*b*, and 202*c* in FIG. 2 may involve extracting instances of concepts that differ from each other.

The first, second, and third portions of the spoken audio stream 102 may be disjoint, contain each other, or otherwise overlap with each other in any combination.

As used herein "extracting an instance of a concept from an audio stream" refers to generating content that represents the instance of the concept, based on a portion of the audio stream 102 that represents the instance of the concept. Such generated content is referred to herein as "concept content." For example, in the case of a "date" concept, an example of extracting an instance of the date concept from the audio stream 102 is generating the text "<DATE>Oct. 1, 1993</DATE>" based on a portion of the audio stream in which "ten one ninety three" is spoken, because both the text "<DATE>Oct. 1, 1993</DATE>" and the speech "one ninety three" represent the same instance of the "date" concept, namely the date Oct. 1, 1993. In this example, the text "<DATE>Oct. 1, 1993</DATE>" is an example of concept content.

As this example illustrates, concept content may include a code and corresponding text. For example, the first concept extraction component 120*a* may extract an instance of the first concept to generate first concept content 122*a* (operation 202*a*) by encoding the instance of the first concept in concept code 108*a* and corresponding text 118*a* in the draft transcript 106, where the concept code 108*a* specifies the first concept (e.g., the "date" concept) and wherein the first text 118*a* represents (i.e., is a literal or non-literal transcription of) the first portion of spoken audio stream 102. Similarly, the second concept extraction component 120*b* may extract an instance of the second concept to generate second concept content 122*b* (operation 202*b*) by encoding the instance of the second concept in concept code 108*b* and corresponding text 118*b* in the draft transcript 106, where the concept code 108*b* specifies the second concept (e.g., the "medications" concept) and wherein the second text 118*b* represents the second portion of spoken audio stream 102. Finally, the third concept extraction component 120*c* may extract an instance of the third concept to generate third concept content 122*c* (operation 202*c*) by encoding the instance of the third concept in concept code 108*c* and corresponding text 118*c* in the draft transcript 106, where the concept code 108*c* specifies the second concept (e.g., the "medications" concept) and wherein the second text 118*c* represents the second portion of spoken audio stream 102.

As stated above, in this example, the text "<DATE>Oct. 1, 1993</DATE>" is an example of concept content that represents an instance of the "date" concept. Concept content need not, however, include both a code and text. Instead, for example, concept content may include only a code (or other specifier of the instance of the concept represented by the code) but not any corresponding text. For example, the concept content 122*a* in FIG. 1A may alternatively include the concept code 108*a* but not the text 118*a*. As another example, concept content may include text but not a corresponding code (or other specifier of the instance of the concept represented by the text). For example, the concept content 122*a* in FIG. 1A may alternatively include the text 118*a* but not the concept code 108*a*. Therefore, any references herein to concept content 122*a-c* should be understood to include embodiments of such content 122*a-c* other than the embodiment shown in FIG. 1A.

The concept extraction components 120*a-c* may take any form. For example, they might be distinct rules, heuristics, statistical measures, sets of data, or any combination thereof. Each of the concept extraction components 120*a-c* may take the form of a distinct computer program module, but this is not required. Instead, for example, some or all of the concept extraction components may be implemented and integrated into in a single computer program module.

As described in more detail below, embodiments of the present invention may track the reliability of each of the concept extraction components 120*a-c*, such as by associating a distinct reliability score or other measure of reliability with each of the concept extraction components 120*a-c*. Such reliability scores may, for example, be implemented by associating and storing a distinct reliability score in connection with each of the concepts extracted by the concept extraction components 120*a-c*. For example, a first reliability score may be associated and stored in connection with the concept generated by concept extraction component 120*a*; a second reliability score may be associated and stored in connection with the concept generated by concept extraction component 120*b*; and a third reliability score may be associated and stored in connection with the concept generated by concept extraction component 120*a*. If some or all of the concept extraction components 120*a-c* are integrated into a single computer program module, then the distinct concept extraction components 120*a-c* shown in FIG. 1A may merely represent the association of distinct reliability scores with distinct concepts, rather than distinct computer program modules or distinct physical components.

As described above, each of the concept contents 122*a-c* in the draft transcript 106 may be created by a corresponding one of the concept extraction components 120*a-c*. Links 124*a-c* in FIG. 1A illustrate the correspondence between concept contents 122*a-c* and the corresponding concept extraction components 120*a-c*, respectively, that created them (or that caused transcription system 104 to create them). More specifically, link 124*a* indicates that concept extraction component 120*a* created or caused the creation of concept content 122*a*; link 124*b* indicates that concept extraction component 120*b* created or caused the creation of concept content 122*b*; and link 124*c* indicates that concept extraction component 120*c* created or caused the creation of concept content 122*c*.

Links 124*a-c* may or may not be generated and/or stored as elements of the system 100*a*. For example, links 124*a-c* may be stored within data structures in the system 100*a*, such as in data structures within the draft transcript 106. For example, each of the links 124*a-c* may be stored within a data structure within the corresponding one of the concept contents 122*a-c*. Such data structures may, for example, be created by or using the concept extraction components 120*a* as part of the process of generating the concept contents 122*a-c* (FIG. 2, operations 202*a-c*). As will be clear from the description below, whether or not the links 124*a-c* are stored within data structures in the system 100*a*, the information represented by links 124*a-c* may later be used to take action based on the correspondence between concept contents 122*a-c* and concept extraction components 120*a-c*.

Embodiments of the present invention may be used in connection with a question-answering system, such as the type described in the above-referenced patent application entitled, "Providing Computable Guidance to Relevant Evidence in Question-Answering Systems." As described therein, one use of question-answering systems is for generating billing codes based on a corpus of clinical medical reports. In this task, a human operator (coder) has to review the content of the clinical medical reports and, based on that content, generate a set of codes within a controlled vocabulary (e.g., CPT and ICD-9 or ICD-10) that can be submitted to a payer for reimbursement. This is a cognitively demanding task which requires abstracting from the document content to generate appropriate billing codes.

In particular, once the draft transcript 106 has been generated, a reasoning module 130 (also referred to herein as an "inference engine") may be used to generate or select appropriate billing codes 140 based on the content of the draft transcript 106 and/or additional data sources. The reasoning module 130 may use any of the techniques disclosed in the above-referenced U.S. patent application Ser. No. 13/025,051 ("Providing Computable Guidance to Relevant Evidence in Question-Answering Systems") to generate billing codes 140. For example, the reasoning module 130 may be a fully automated reasoning module, or combine automated reasoning with human reasoning provided by a human billing code expert.

Although billing codes 140 are shown in FIG. 1A as containing three billing codes 142*a-c*, billing codes 140 may contain fewer or greater than three billing codes. The billing codes 140 may be stored and represented in any manner. For example, the billing codes 140 may be integrated with and stored within the draft transcript 106.

The reasoning module 130 may encode the applicable rules and regulations for billing coding published by, e.g., insurance companies and state agencies. The reasoning module

130 may, for example, include forward logic components 132*a-c*, each of which implements a distinct set of logic for mapping document content to billing codes. Although three forward logic components 132*a-c* are shown in FIG. 1A for purposes of example, the reasoning module 130 may include any number of forward logic components, which need not be the same as the number of concept extraction components 120*a-c* or the number of concept contents 122*a-c*.

Although the reasoning module 130 is shown in FIG. 1A as receiving the draft transcript 106 as input, this is merely one example and does not constitute a limitation of the present invention. The reasoning module 130 may receive input from, and apply forward logic components 132*a-c* to, data sources in addition to and/or instead of the draft transcript 106. For example, the reasoning module 106 may receive multiple documents (e.g., multiple draft transcripts created in the same manner as draft transcript 106) as input. Such multiple documents may, for example, be a plurality of reports about the same patient. As another example, the reasoning module 106 may receive a database record, such as an Electronic Medical Record (EMR), as input. Such a database record may, for example, contain information about a particular patient, and may have been created and/or updated using data derived from the draft transcript 106 and/or other document(s). The database record may, for example, contain text and/or discrete facts (e.g., encoded concepts of the same or similar form as concept contents 122*a-c*). The transcription system 104 may apply concept extraction components 120*a-c* to text in the database record but not apply concept extraction components 120*a-c* to any discrete facts in the database record, thereby leaving such discrete facts unchanged.

As another example, the reasoning module 106 may receive a text document (e.g., in ASCII or HTML), which is then processed by data extraction components (not shown) to encode the text document with concept content in a manner similar to that in which the concept extraction components 120*a-c* encode concept contents based on an audio stream. Therefore, any reference herein to the use of the draft transcript 106 by the reasoning module 130 should be understood to refer more generally to the use of any data source (such as a data source containing data relating to a particular patient or a particular procedure) by the reasoning module 130 to generate billing codes 140.

Figure 1B:
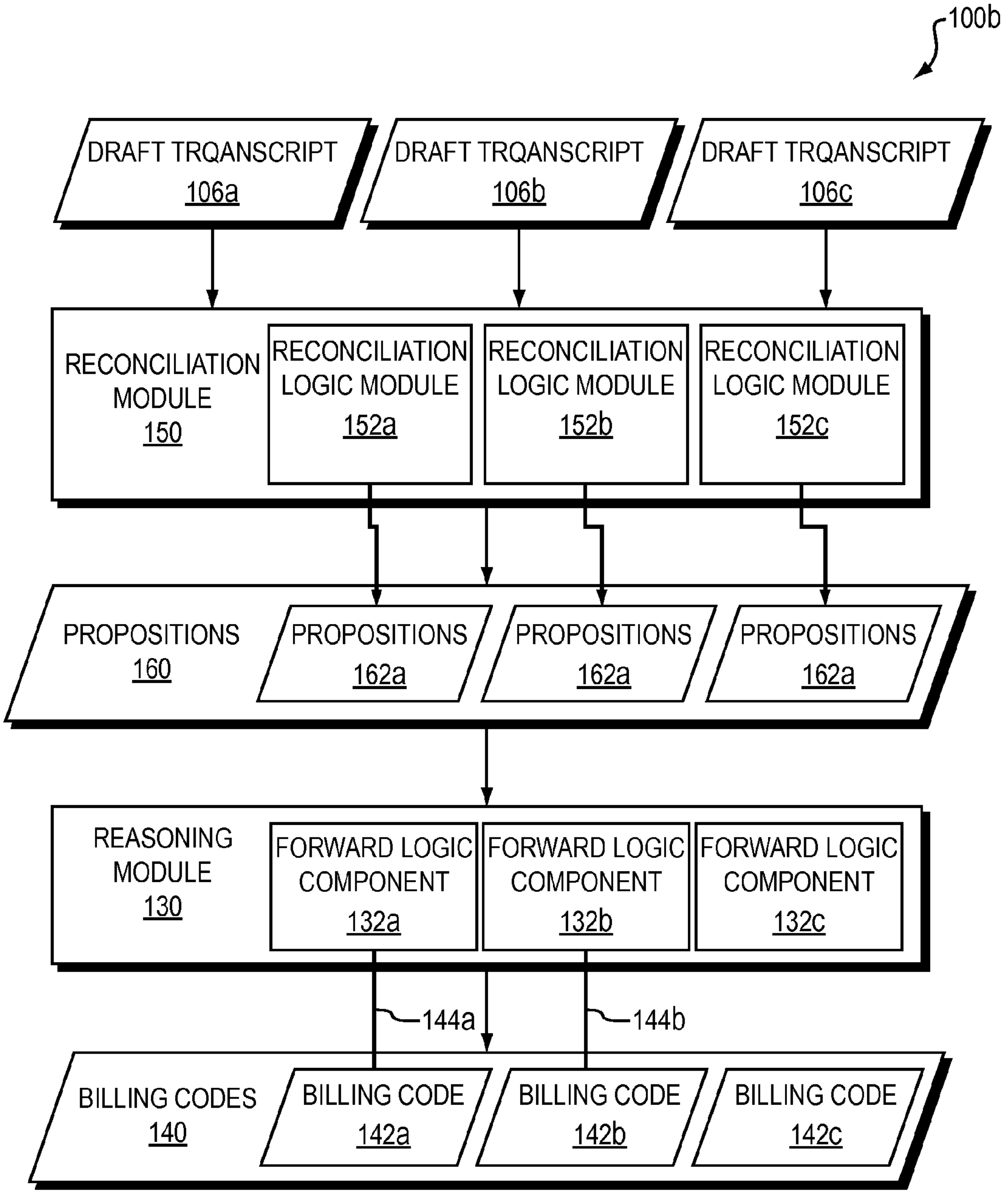
FIG. 1B is a dataflow diagram of a system for deriving propositions from content according to one embodiment of the present invention.

Furthermore, although in the example of FIG. 1A the reasoning module 130 receives concept content 122*a-c* as input, this is merely an example. Alternatively or additionally, for example, and as shown in FIG. 1B, the reasoning module 130 may receive propositions 160 (also referred to herein as "facts") as input. Propositions 160 may include data representing information derived from one or more draft transcripts 106*a-c* (which may include the draft transcript 106 of FIG. 1A). For example, propositions 160 may include any number of propositions 162*a-c* derived from draft transcripts 106*a-c* by a reconciliation module 150. A proposition may, for example, represent information about a particular patient, such as the fact that the patient has diabetes.

The reconciliation module 150 may derive the propositions 162*a-c* from the draft transcripts 106*a-c* by, for example, applying reconciliation logic modules 152*a-c* to the draft transcripts 106*a-c* (e.g., to the concept contents 122*a-c* within the draft transcripts 106*a-c*). Each of the reconciliation logic modules 152*a-c* may implement distinct logic for deriving propositions from draft transcripts 106*a-c*. A reconciliation logic module may, for example, derive a proposition from a single concept content (such as by deriving the proposition "patient has diabetes" from a <DIABETES_NOT_FURTHER_SPECIFIED>code). As another example, a reconciliation logic module may derive a proposition from multiple concept contents, such as by deriving the proposition "patient has uncontrolled diabetes" from a <DIABETES_NOT_FURTHER_SPECIFIED> code and a <DIABETES_UNCONTROLLED> code. The reconciliation module 150 may perform such derivation of a proposition from multiple content contents by first deriving distinct propositions from each of the content contents and then applying a reconciliation logic module to the distinct propositions to derive a further proposition.

This is an example of reconciling a general concept with a specialization of the general concept by deriving a proposition representing the specialization of the general concept. Those having ordinary skill in the art will understand how to implement other reconciliation logic for reconciling multiple concepts to generate propositions resulting from such reconciliation. Furthermore, the reconciliation module 150 need not be limited to applying reconciliation logic modules 152*a-c* to draft transcripts 106*a-c* in a single iteration. More generally, reconciliation module 150 may, for example, repeatedly (e.g., periodically) apply reconciliation logic modules 152*a-c* to the current set of propositions 162*a-c* to refine existing propositions and to add new propositions to the set of propositions 160. As new draft transcripts are provided as input to the reconciliation module 150, the reconciliation module 150 may derive new propositions from those draft transcripts, add the new propositions to the set of propositions 160, and again apply reconciliation logic modules 152*a-c* to the new set of propositions 160.

As described in more detail below, embodiments of the present invention may track the reliability of various components of the systems 100*a-b*, such as individual concept extraction components 120*a-c*. The reconciliation module 150 may propagate the reliability of one concept to other concepts that are derived from that concept using the reconciliation logic modules 152*a-c*. For example, if a first concept has a reliability score of 50%, then the reconciliation module 150 may assign a reliability score of 50% to any proposition that the reconciliation module 150 derives from the first concept. When the reconciliation module 150 derives a proposition from multiple propositions, the reconciliation module 150 may assign a reliability score to the derived proposition based on the reliability scores of the multiple propositions in any of a variety of ways.

The propositions 160 may be represented in a different form than the concept contents 122*a-c* in the draft transcripts 106*a-c*. For example, the concept contents 122*a-c* may be represented in a format such as SNOMED, while the propositions 162*a-c* may be represented in a format such as ICD-10.

The reasoning module 130 may reason on the propositions 160 instead of or in addition to the concepts represented by the draft transcripts 106*a-c*. For example, the systems 100*a* (FIG. 1A) and 100*b* (FIG. 1B) may be combined with each other to produce a system which: (1) uses the transcription system 104 to extract concept contents from one or more spoken audio streams (e.g., audio stream 102); (2) uses the reconciliation module 150 to derive propositions 160 from the draft transcripts 106*a-c*; and (3) uses reasoning module 130 to apply forward logic components 132*a-c* to the derived propositions 160 and thereby to generate billing codes 140 based on the propositions 160. Any reference herein to applying the reasoning module 130 to concept content should be understood to refer to applying the reasoning module 130 to propositions 160 in addition to or instead of concept content.

Although the reasoning module 130 may, for example, be either statistical or symbolic (e.g., decision logic), for ease of explanation and without limitation the reasoning module 130 in the following description will be assumed to reason based on symbolic rules. For example, each of the forward logic components 132*a-c* may implement a distinct symbolic rule for generating or selecting billing codes 140 based on information derived from the draft transcript 106. Each such rule includes a condition (also referred to herein as a premise) and a conclusion. The conclusion may specify one or more billing codes. As described in more detail below, if the condition of a rule is satisfied by content (e.g., concept content) of a data source, then the reasoning module 130 may generate the billing code specified by the rule's conclusion.

A condition may, for example, require the presence in the data source of a concept code representing an instance of a particular concept. Therefore, in the description herein, "condition A" may refer to a condition which is satisfied if the data source contains a concept code representing an instance of concept A, whereas "condition B" may refer to a condition which is satisfied if the data source contains a concept code representing an instance of concept B, where concept A may differ from concept B. Similarly, "condition A" may refer to a condition which is satisfied by the presence of a proposition representing concept A in the propositions 160, while "condition B" may refer to a condition which is satisfied by the presence of a proposition representing concept B in the propositions 160. These are merely examples of conditions, however, not limitations of the present invention. A condition may, for example, include multiple sub-conditions (also referred to herein as clauses) joined by one or more Boolean operators.

One advantage of symbolic rules systems is that as rules and regulations change, the symbolic rules represented by the forward logic components 132*a-c* may be adjusted manually without the need to re-learn the new set of rules on an annotated corpus respectively from observing operator feedback.

Furthermore, not all elements of the systems 100*a* (FIG. 1A) and 100*b* (FIG. 1B) are required. For example, embodiments of the present invention may omit the transcription system 104 and receive as input one or more draft transcripts 106*a-c*, regardless of how such draft transcripts 106*a-c* were generated. The draft transcripts 106*a-c* may already contain concept contents. Alternatively, the draft transcripts 106*a-c* may not contain concept contents, in which case embodiments of the present invention may create concept contents within the draft transcripts 106*a-c*, such as by marking up existing text within the draft transcripts 106*a-c* with concept codes using the concept extraction components 120*a-c* or other components. As these examples illustrate, embodiments of the present invention need not receive or act on audio streams, such as audio stream 102.

Furthermore, although transcript 106 and transcripts 106*a-c* are referred to herein as "draft" transcripts, embodiments of the present invention may be applied not only to draft documents but more generally to any document, such as documents that have been reviewed, revised, and finalized, so that they are no longer drafts.

An example of three rules that may be implemented by forward logic components 132*a-c*, respectively, are shown in Table 1:

TABLE 1

| Rule No. | Premise | Conclusion |
|---|---|---|
| 1 | patient_has_problem<br><DIABETES> : p | addBillingCode<br>(<DIABETES_NOT_FURTHER_SPECIFIED) |
| 2 | patient_has_problem<br><DIABETES> : p<br>AND<br>p.getStatus( ) ==<br><UNCONTROLLED> | addBillingCode<br>(<UNCONTROLLED_DIABETES>) |
| 3 | patient_has_problem<br><DIABETES> : p<br>AND<br>p.getStatus ==<br><UNCONTROLLED><br>AND<br>p.hasRelatedFinding<br>(hyperosmolarity) | addBillingCode<br>(<UNCONTROLLED_DIABETES>) |

Each of the three rules is of the form "if (premise) then (conclusion)," where the premise and conclusion of each rule is as shown in Table 1. More specifically, in the example of Table 1:

- Rule #1 is for generating a billing code if the data source specifies that the patient has diabetes, but the data source does not mention that the patient has any complications in connection with diabetes. In particular, Rule #1 indicates that if the data source specifies that the patient has diabetes, then the reasoning module 130 should add the billing code <DIABETES_NOT_FURTHER_SPECIFIED> to the billing codes 140.
- Rule #2 is for generating a billing code if the data source specifies that the patient has uncontrolled diabetes. In particular, Rule #2 indicates that if the data source specifies that the patient has diabetes and that the status of the patient's diabetes is uncontrolled, then the reasoning module 130 should add the billing code <UNCONTROLLED_DIABETES> to the billing codes 140.
- Rule #3 is for generating a billing code if the data source specifies that the patient has diabetes with hyperosmolarity. In particular, Rule #3 indicates that if the data source specifies that the patient has diabetes and that the patient has hyperosmolarity, then the reasoning module 130 should add the billing code <UNCONTROLLED_DIABETES> to the billing codes 140.

The reasoning module 130 may generate the set of billing codes 140 based on the data source (e.g., draft transcript 106) by initializing the set of billing codes 140 (e.g., creating an empty set of billing codes) (FIG. 2, operation 204) and then applying all of the forward logic components 132*a-c* (e.g., symbolic rules) to the data source (FIG. 2, operation 206). For each forward logic component L, the reasoning module 130 determines whether the data source satisfies the conditions of forward logic component L (FIG. 2, operation 208). If such conditions are satisfied, the reasoning module 130 adds one or more billing codes specified by forward logic component L to the set of billing codes 140 (FIG. 2, operation 210). In the particular case of forward logic components 132*a* that take the form of rules, if the data source satisfies the premise of such a rule, then the reasoning module 130 add the billing code(s) specified by the conclusion of the rule to the set of billing codes 140. If the conditions specified by forward logic component L are not satisfied, then the reasoning module 130 does not add any billing codes to the set of billing codes 140 (FIG. 2, operation 212).

As previously mentioned, the reasoning module 130 may generate the set of billing codes 140 based on the propositions 160 instead of the data source (e.g., draft transcript 106), in which case any reference herein to applying forward logic components 132*a-c* to concept codes or to the data source should be understood to refer to applying forward logic components 132*a-c* to the propositions 160. For example, the conditions of the rules in Table 1 may be applied to the propositions 160 instead of to codes in the data source.

Figure 3:
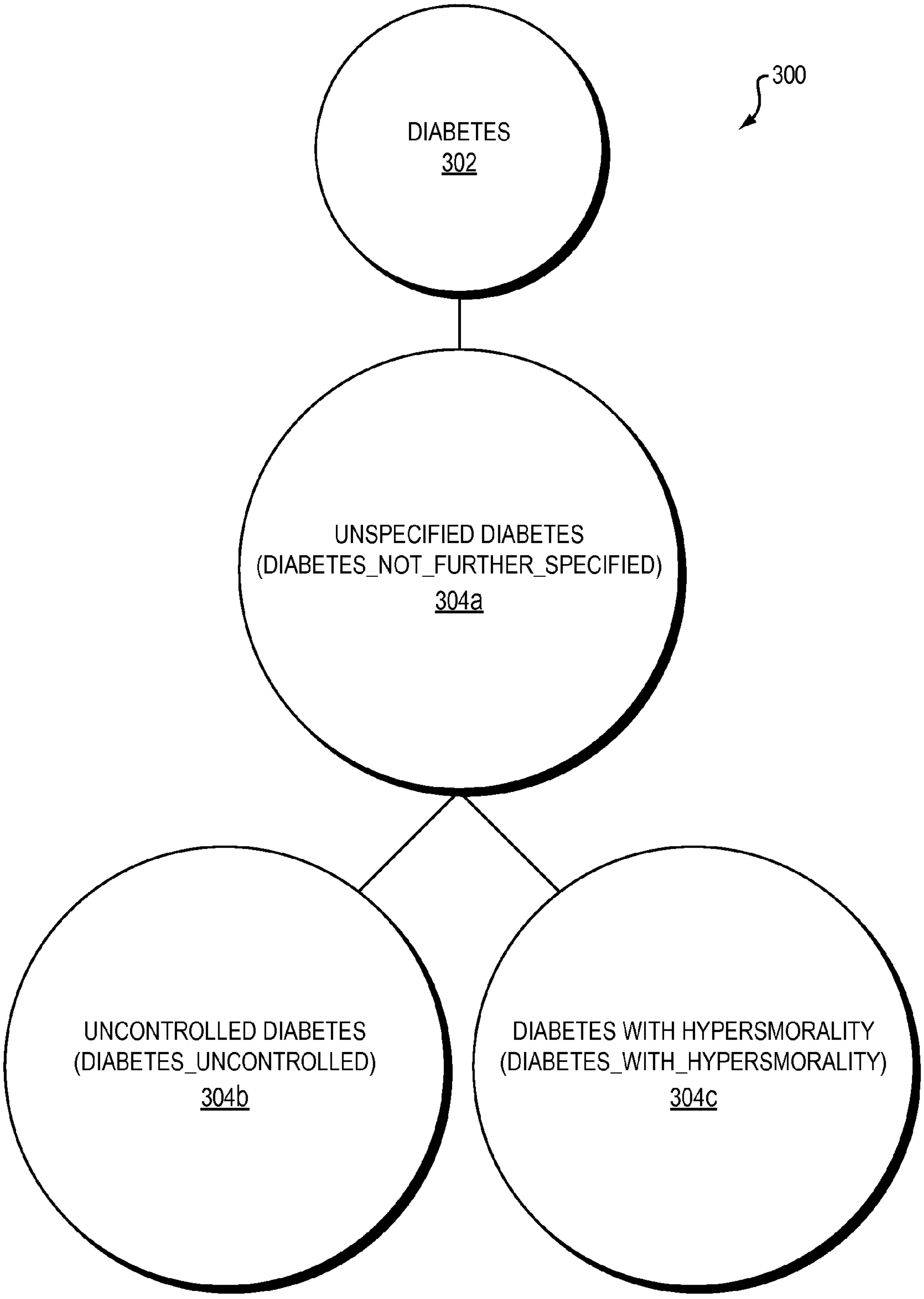
FIG. 3 is a diagram of a concept ontology according to one embodiment of the present invention.

Billing codes may represent concepts organized in an ontology. For example, FIG. 3 shows a highly simplified example of an ontology 300 including concepts relating to diabetes. The ontology includes: (1) a root node 302 representing the general concept of diabetes; (2) a first child node 304*a* of root node 302, representing the concept of unspecified diabetes; and (3) a second child node 304*b* of root node 302, representing the concept of uncontrolled diabetes. Any particular node in the ontology 300 may or may not have a corresponding code (e.g., billing code). For example, in the ontology 300 of FIG. 3, the general concept of diabetes (represented by root node 302) may not have any corresponding code, whereas the child nodes 304*a-b* may both have corresponding codes.

If a particular node represents a first concept, and a child node of the particular node represents a second concept, then the second concept may be a "specialization" of the first concept. For example, in the ontology 300 of FIG. 3, the concept of unspecified diabetes (represented by node 304*a*) is a specialization of the general concept of diabetes (represented by node 302), and the concepts of uncontrolled diabetes (represented by node 304*b*) and diabetes with hyperosmorality (represented by node 304*c*) are specializations of the general concept of diabetes (represented by node 302). More generally, the concept represented by a node may be a specialization of the concept represented by any ancestor (e.g., parent, grandparent, or great-grandparent) of that node.

Operation 208 of the method 200 of FIG. 2 may treat a condition as satisfied by data in the data source if the concept represented by that data satisfies the condition or if the concept represented by that data is a specialization of a concept that satisfies the condition. For example, if a particular condition is satisfied by the concept of diabetes (represented by node 302 in FIG. 3), then operation 208 may treat data that represents unspecified diabetes (represented by node 304*a* in FIG. 3) as satisfying the particular condition, because unspecified diabetes is a specialization of diabetes.

To further understand the method 200 of FIG. 2, consider a particular example in which the reasoning module 130 finds that the draft transcript 106 contains a finding related to a patient that has been marked up with a code indicating that the patient has diabetes or any specializations of that code within the corresponding ontology. In this case, the condition of forward logic component 132*a* (e.g., Rule #1) would be satisfied, and the reasoning module 130 would add a billing code <DIABETES_NOT_FURTHER_SPECIFIED> to the current set of billing codes 140 being generated. Assume for purposes of example that billing code 142*a* in FIG. 1A is the billing code <DIABETES_NOT_FURTHER_SPECIFIED>.

Similarly, assume that the reasoning module 130 finds that the draft transcript 106 contains a finding related to the same patient that has been marked up with a code of "<DIABETES_UNCONTROLLED>." In this case, the condition of forward logic component 132*b* (e.g., Rule #2) would be satisfied, and the reasoning module 130 would add a billing code <DIABETES_UNCONTROLLED> to the current set of billing codes 140 being generated. Assume for purposes of example that billing code 142*b* is the billing code <DIABETES_UNCONTROLLED>.

Further assume that the draft transcript 106 contains no evidence that the same patient suffers from hyperosmorality. As a result, the reasoning module 130 would not find that the condition of forward logic component 132*c* (e.g., Rule #3) is satisfied and, as a result, forward logic component 132*c* would not cause any billing codes to be added to the set of billing codes 140 in this example.

In this example, although the set of billing codes 140 would now contain both the billing code <DIABETES_NOT_FURTHER_SPECIFIED> and the billing code <UNCONTROLLED_DIABETES>, the code <UNCONTROLLED_DIABETES> should take precedence over the code <DIABETES_NOT_FURTHER_SPECIFIED>. The reasoning module 130 may remove the now-moot code <DIABETES_NOT_FURTHER_SPECIFIED>, for example, by applying a re-combination step. For example, if a generated code A represents a specialization of the concept represented by a generated code B, then the two codes A and B may be combined with each other. As another example, if the clauses Z1 of a rule that generates a code Y1 strictly implies a clause Z2 of a rule that generates a code Y2, then the two codes Y1 and Y2 may be combined with each other (e.g., so that code Y1 survives the combination but code Y2 does not). As another example, codes may be combined based on a rule, e.g., a rule that specifies that if code A and B have been generated, then codes A and B should be combined (e.g., so that code A survives the combination but code B does not). As yet another example, statistical or other learned measures of recombination may be used.

FIG. 1A also shows links 134*a-b* between concept contents 122*a-c* in the data source (e.g., draft transcript 106) and forward logic components 132*a-b* having conditions that were satisfied by such concept contents 122*a-c* in operation 208 of FIG. 2. For example, link 134*a* indicates that concept content 122*a* (e.g., the concept code 108*a*) satisfied the condition of forward logic component 132*a*, and that the reasoning module 130 generated the billing code 142*a* in response to such satisfaction. Similarly, link 134*b* indicates that concept content 122*b* (e.g., the concept code 108*b*) satisfied the condition of forward logic component 132*b*, and that the reasoning module 130 generated the billing code 142*b* in response to such satisfaction.

Links 134*a-b* may or may not be generated and/or stored as elements of the system 100*a*. For example, links 134*a-b* may be stored within data structures in the system 100*a*, such as in data structures within the set of billing codes 140. For example, each of the billing codes may contain data identifying the forward logic component concept content (or part thereof) that caused the billing code to be generated. The reasoning module 130 may, for example, generate and store data representing the links 134*a-b* as part of the process of adding individual billing codes 142*a-b*, respectively, to the system 100*a* in operation 210 of FIG. 2.

FIG. 1A also shows links 144*a-b* between forward logic components 132*a-b* and the billing codes 142*a-b* generated by the reasoning module 130 as a result of, and in response to, determining that the conditions of the forward logic components 132*a-b* were satisfied by the data source (e.g., draft transcript 106). More specifically, link 144*a* indicates that billing code 142*a* was generated as a result of, and in response to, the reasoning module 130 determining that the data source satisfied the condition of forward logic component 132*a*. Similarly, link 144*b* indicates that billing code 142*b* was generated as a result of, and in response to, the reasoning module 130 determining that the data source satisfied the condition of forward logic component 132*b*.

Links 144*a-b* may or may not be generated and/or stored as elements of the system 100*a*. For example, links 144*a-b* may be stored within data structures in the system 100*a*, such as in data structures within the set of billing codes 140. For example, each of the billing codes may contain data identifying the forward logic component that caused the billing code to be generated. The reasoning module 130 may, for example, generate and store data representing the links 144*a-b* as part of the process of adding individual billing codes 142*a-b*, respectively, to the system 100*a* in operation 210 of FIG. 2.

Figure 4:
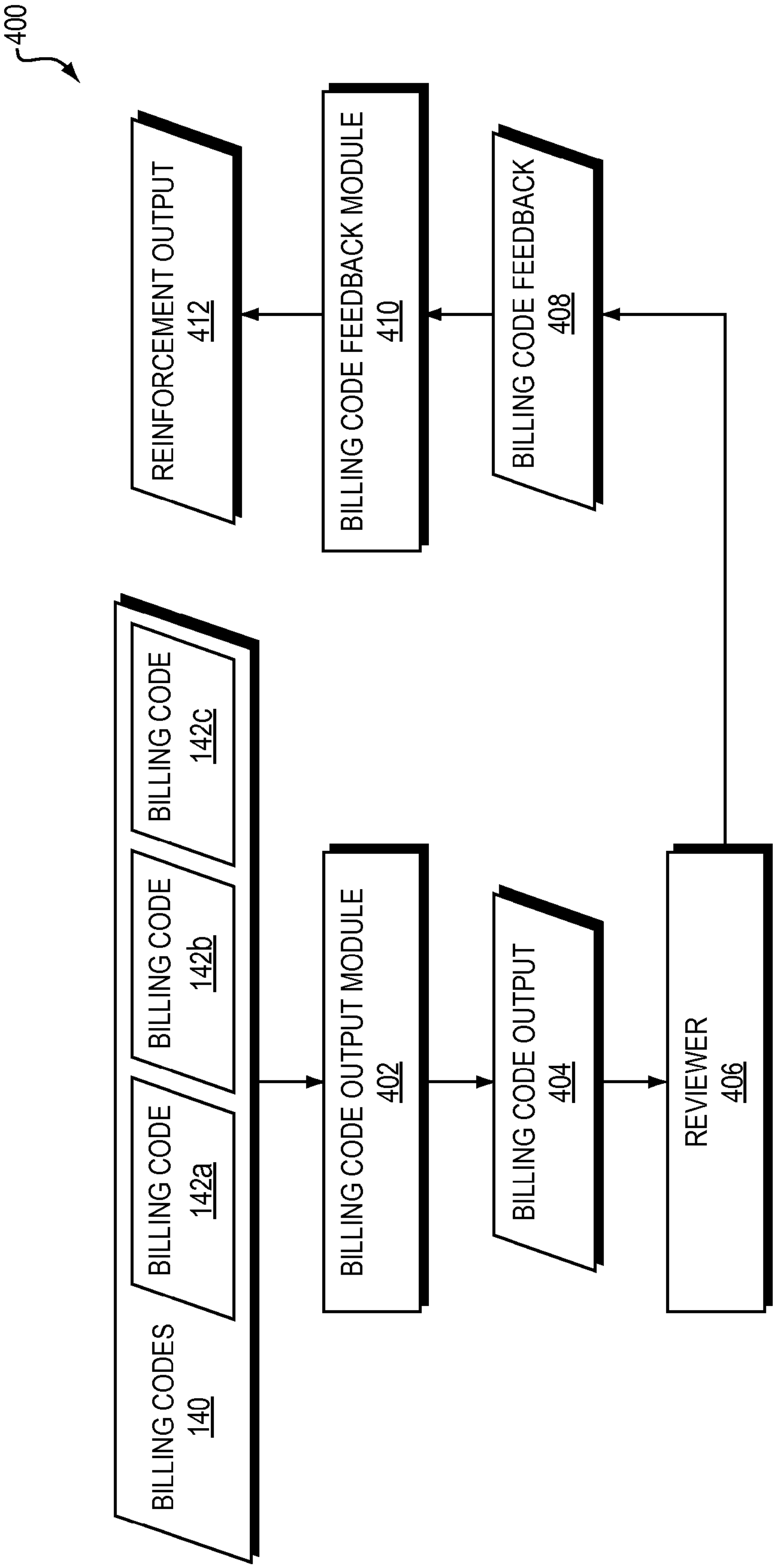
FIG. 4 is a dataflow diagram of a system for receiving feedback on billing codes from a human reviewer and for automatically assessing and improving the performance of the system according to one embodiment of the present invention.
Figure 5A:
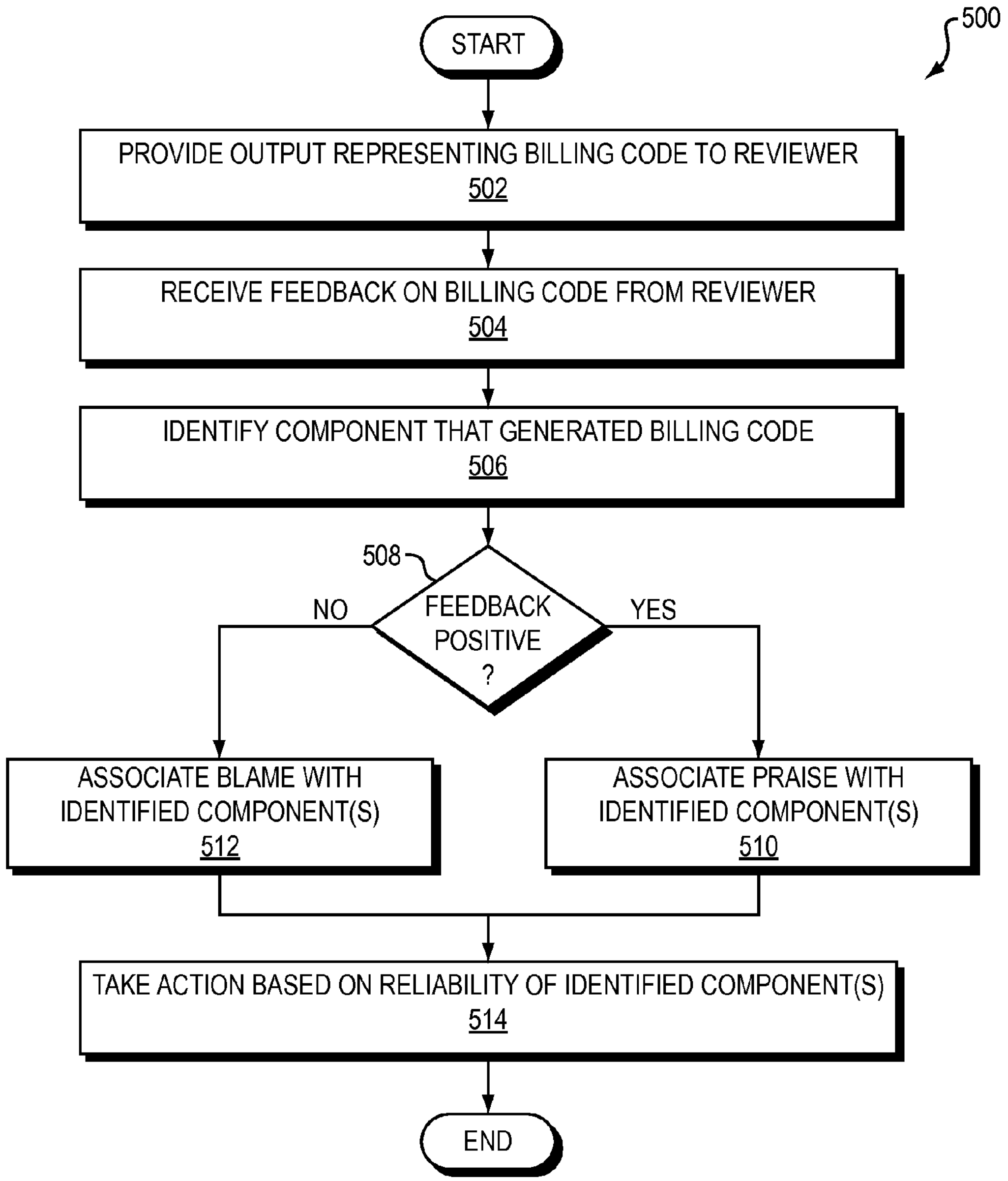
FIG. 5A is a flowchart of a method performed by the system of FIG. 5.

The set of billing codes 140 that is output by the reasoning module 130 may be reviewed by a human operator, who may accept or reject/modify the billing codes 140 generated by the automatic system 100*a*. More specifically, FIG. 4 is a dataflow diagram of a system 400 for receiving feedback on the billing codes 140 from a human reviewer 406 and for automatically assessing and improving the performance of the system 100*a* in response to and based on such feedback according to one embodiment of the present invention. FIG. 5A is a flowchart of a method 500 performed by the system 400 of FIG. 4 according to one embodiment of the present invention.

A billing code output module 402 provides output 404, representing some or all of the billing codes 142*a-c*, to the human reviewer 406 (FIG. 5A, operation 502). The billing code output 404 may take any form, such as textual representations of the billing codes 142*a-c* (e.g., "DIABETES_NOT_FURTHER_SPECIFIED" and/or "Unspecified Diabetes" in the case of billing code 142*a*). The output 404 may also include output representing any of element(s) of the system 100*a*, such as output representing some or all of the data source (e.g., draft transcript 106) and/or spoken audio stream 102. Such additional output may assist the reviewer 406 in evaluating the accuracy of the billing codes 140. Embodiments of the present invention are not limited to any particular form of the output 404.

The human reviewer 406 may evaluate some or all of the billing codes 140 and make a determination regarding whether some or all of the billing codes 140 are accurate. The human reviewer 406 may make this determination in any way, and embodiments of the present invention do not depend on this determination being made in any particular way. The human reviewer 406 may, for example, determine that a particular one of the billing codes 140 is inaccurate because it is inconsistent with information represented by the spoken audio stream 102 and/or the draft transcript 106.

For example, the human reviewer 406 may conclude that one of the billing codes 142*a* is inaccurate because the billing code is inconsistent with the meaning of some or all of the text (e.g., text 118*a-c*) in the data source. As one particular example of this, the human reviewer 406 may conclude that one of the billing codes 142*a* is inaccurate because the billing code is inconsistent with the meaning of text in the data source that has been encoded incorrectly by the transcription system 104. For example, the human reviewer 406 may conclude that billing code 142*a* is inaccurate as a result of concept extraction component 120*a* incorrectly encoding text 118*a* with concept code 108*a*. In this case, concept code 108*a* may represent a concept that is not represented by text 118*a* or by the speech in the spoken audio stream 102 that caused the transcription system 104 to generate the text 118*a*. As this example illustrates, the reasoning module 130 may generate an incorrect billing code as the result of providing an invalid premise (e.g., inaccurate concept content 122*a*) to one of the forward logic components 132*a-c*, where the invalid premise includes concept content that was generated by one of the concept extraction components 120*a-c*.

The system 400 also includes a billing code feedback module 408. Once the human reviewer 406 has determined whether a particular billing code is accurate, the reviewer 406 provides input 408 representing that determination to a billing code feedback module 410 (FIG. 5A, operation 504). In general, the input 408 represents a verification status of the reviewed billing code, where the verification status may have a value selected from a set of permissible values, such as "accurate" and "inaccurate" or "true" and "false." The feedback 408 may include feedback on the accuracy of one or more of the billing codes 142*a-c*.

As will now be described in more detail, the feedback 408 provided by the reviewing human operator 406 may be captured and interpreted automatically to assess the performance of the automatic billing coding system 100*a*. In particular, embodiments of the present invention are directed to techniques for inverting the reasoning process of the reasoning module 130 in a probabilistic way to assign blame and/or praise for an incorrectly/correctly-generated billing code to the constituent logic clauses which lead to the generation of the billing code.

In general, the billing code feedback module 410 may identify one or more components of the billing code generation system 100*a* that was responsible for generating the billing code corresponding to the feedback 408 (FIG. 5A, operation 506), and associate either blame (e.g., a penalty or other negative reinforcement) or praise (e.g., a reward or other positive reinforcement) with that component.

Examples of components that may be identified as responsible for generating the billing code associated with the feedback 408 are the concept extraction components 120*a-c* and the forward logic components 132*a-c*. The system 400 may identify the forward logic component responsible for generating a billing code by, for example, following the link from the billing code back to the corresponding forward logic component. For example, if the reviewer 406 provides feedback 408 on billing code 142*b*, then the feedback module 410 may identify forward logic component 132*b* as the forward logic component that generated billing code 142*b* by following the link 144*b* from billing code 142*b* to forward logic component 132*b*. It is not necessary, however, to use links to identify the forward logic component responsible for generating a billing code. Instead, and as will be described in more detail below, inverse logic may be applied to identify the responsible forward logic component without the use of links.

The billing code feedback module 410 may associate a truth value with the identified forward logic component. For example, if the reviewer's feedback 408 confirms the reviewed billing code, then the billing code feedback module 410 may associate a truth value of "true" with the identified forward logic component; if the reviewer's feedback 408 disconfirms the reviewed billing code, then the billing code feedback module 410 may associate a truth value of "false" with the identified forward logic component. The billing code feedback module 410 may, for example, store such a truth value in or in association with the corresponding forward logic component.

The system 400 (in operation 506) may identify the concept extraction component responsible for generating the billing code by, for example, following the series of links from the billing code back to the corresponding forward logic component. For example, if the reviewer 406 provides feedback 408 on billing code 142*b*, then the feedback module 410 may identify the concept extraction component 120*b* as the concept extraction component that generated billing code 142*b* by following the link 144*b* from billing code 142*b* to forward logic component 132*b*, by following the link 134*b* from the forward logic component 132*b* to the concept content 122*b*, and by following the link 124*b* from the concept content 122*b* to the concept extraction component 120*b*. It is not necessary, however, to use links to identify the concept extraction component responsible for generating a billing code. Instead, and as will be described in more detail below, inverse logic may be applied to identify the responsible concept extraction component without the use of links.

The system 400 (in operation 506) may identify more than one component as being responsible for generating a billing code, including components of different types. For example, the system 400 may identify both the forward logic component 132*b* and the concept extraction component 120*b* as being responsible for generating billing code 142*b*.

The system 400 (in operation 506) may, additionally or alternatively, identify one or more sub-components of a component as being responsible for generating a billing code. For example, as illustrated by the example rules above, a forward logic component may represent logic having multiple clauses (sub-conditions). For example, consider a forward logic component that implements a rule of the form "if A AND B, Then C." Such a rule contains two clauses (sub-conditions): A and B. In the description herein, each such clause is said to be correspond to and be implemented by a "sub-component" of the forward logic component that implements the rule containing the clauses.

The system 400 (in operation 506) may identify, for example, one or both of these clauses individually as being responsible for generating a billing code. Therefore, any reference herein to taking action in connection with (such as associating blame or praise with) a "component" of the system 100*a* should also be understood to refer to taking the action in connection with one or more sub-components of the component. In particular, each sub-component of a forward logic component may correspond to and implement a distinct clause (sub-condition) of the logic represented by the forward logic component.

The billing code feedback module 410 may associate reinforcement with the component identified in operation 506 in a variety of ways. Associating reinforcement with a component is also referred to herein as "applying" reinforcement to the component.

The billing code feedback module 410 may, for example, determine whether the feedback 408 provided by the human reviewer 406 is positive, i.e., whether the feedback 408 indicates that the corresponding billing code is accurate (FIG. 5A, operation 508). If the feedback 408 is positive, the billing code feedback module 410 associates praise with the system component(s) identified in operation 506 (FIG. 5A, operation 510). If the feedback 408 is negative, the billing code feedback module 410 associates blame with the system component(s) identified in operation 506 (FIG. 5A, operation 512).

Both praise and blame are examples of "reinforcement" as that term is used herein. Therefore, in general the billing code feedback module 410 may generate reinforcement output 412, representing praise and/or blame, as part of operations 510 and 512 in FIG. 5A. Such reinforcement output 412 may take any of a variety of forms. For example, a score, referred to herein as a "reliability score," may be associated with each of one or more components (e.g., concept extraction components 120*a-c* and forward logic components 132*a-c*) in the system 100*a*. The reliability score of a particular component represents an estimate of the degree to which the particular component reliably generates accurate output (e.g., accurate concept codes 108*a-c* or billing codes 142*a-c*). Assume for purposes of example that the value of a reliability score may be a real number that ranges from 0 (representing complete unreliability) to 1 (representing complete reliability). The reliability score associated with each particular component may be initialized to some initial value, such as 0, 1, or 0.5.

As mentioned above, reliability scores may be associated and stored in connection with representations of concepts, rather than in connection with concept extraction components. In either case, a concept may have one or more attributes, and reliability scores may be associated with attributes of the concept in addition to being associated with the concept itself. For example, if a concept has two attributes, then a first reliability score may be associated with the concept, a second reliability score may be associated with the first attribute, and a second reliability score may be associated with the second attribute.

This particular reliability score scheme is merely one example and does not constitute a limitation of the present invention, which may implement reinforcement output 412 in any way. For example, the scale of reliability scores may be inverted, so that 0 represents complete reliability and 1 represents complete unreliability. In this case, the reliability score may be thought of as a likelihood of error, ranging from 0% to 100%.

Associating praise (positive reinforcement) with a particular component (FIG. 5A, operation 510) may include increasing (e.g., incrementing) a reliability score counter associating with the component, assigning a particular reliability score to the component (e.g., 0, 0.5, or 0.1), increasing the reliability score associated with the particular component, such as by a predetermined amount (e.g., 0.01 or 0.1), by a particular percentage (e.g., 1%, 5%, or 10%), or by using the output of an algorithm. Similarly, associating blame (negative reinforcement) with a particular component (FIG. 5A, operation 512) may include decreasing (e.g., decrementing) or otherwise decreasing a reliability score counter associated with the component, assigning a particular reliability score to the component (e.g., 0, 0.5, or 0.1), decreasing the reliability score associated with the particular component, such as by a predetermined amount (e.g., 0.01 or 0.1), by a particular percentage (e.g., 1%, 5%, or 10%), or by using the output of an algorithm.

In addition to or instead of associating a reliability score with a component, a measure of relevance may be associated with the component. Such a measure of relevance may, for example, be a counter having a value that is equal or proportional to the number of observed occurrences of instances of the concept generated by the component. For example, each time an instance of a concept generated by a particular component is observed, the relevance counter associated with that component If the billing code feedback module 410 applies reinforcement (i.e., blame or praise) to multiple components of the same type (e.g., multiple forward logic components, or multiple clauses of a single forward logic component), the billing code feedback module 410 may divide (apportion) the reinforcement among the multiple components of the same type, whether evenly or unevenly. For example, if the billing code feedback module 410 determines that two clauses of forward logic component 132*b* are responsible for generating incorrect billing code 142*b*, then the billing code feedback module 410 may assign half of the blame to the first clause and half of the blame to the second clause, such as by dividing (apportioning) the total blame to be assigned in half (e.g., by dividing a blame value of 0.1 into a blame value of 0.05 assigned to the first clause and a blame value of 0.05 assigned to the second clause).

As yet another example, the billing code feedback module 410 may apply reinforcement to a particular component (or sub-component) of the system 100*a* by assigning, to the component, a prior known likelihood of error associated with the component. For example, a particular component may be observed in a closed feedback loop in connection with a plurality of different rules. The accuracy of the component may be observed, recorded, and then used as a prior known likelihood of error for that component by the billing code feedback module 410.

The results of applying reinforcement output 412 to the component identified in operation 506 may be stored within the system 100*a*. For example, the reliability score associated with a particular component may be stored within, or in association with, the particular component. For example, reliability scores associated with concept extraction components 120*a-c* may be stored within concept extraction components 120*a-c*, respectively, or within transcription system 104 and be associated with concept extraction components 120*a-c*. Similarly, reliability scores associated with forward logic components 132*a-c* may be stored within forward logic components 132*a-c*, respectively, or within reasoning module 130 and be associated with forward logic components 132*a-c*. As another example, reliability scores may be stored in, or in association with, billing codes 142*a-c*. For example, the reliability score(s) for the forward logic component and/or concept extraction component responsible for generating billing code 142*a* may be stored within billing code 142*a*, or be stored within billing codes 140 and be associated with billing code 142*a*.

As mentioned above, the component that generated a billing code may be identified in operation 506 by, for example, following one or more links from the billing code to the component. Following such links, however, merely identifies the component responsible for generating the billing code. Such identification, however, may identify a component that includes multiple sub-components, some of which relied on accurate data to generate the billing code, and some of which relied on inaccurate data to generate the billing code. It is not desirable to assign blame to sub-components that relied on accurate data or to assign praise to sub-components that relied on inaccurate data.

Figure 5B:
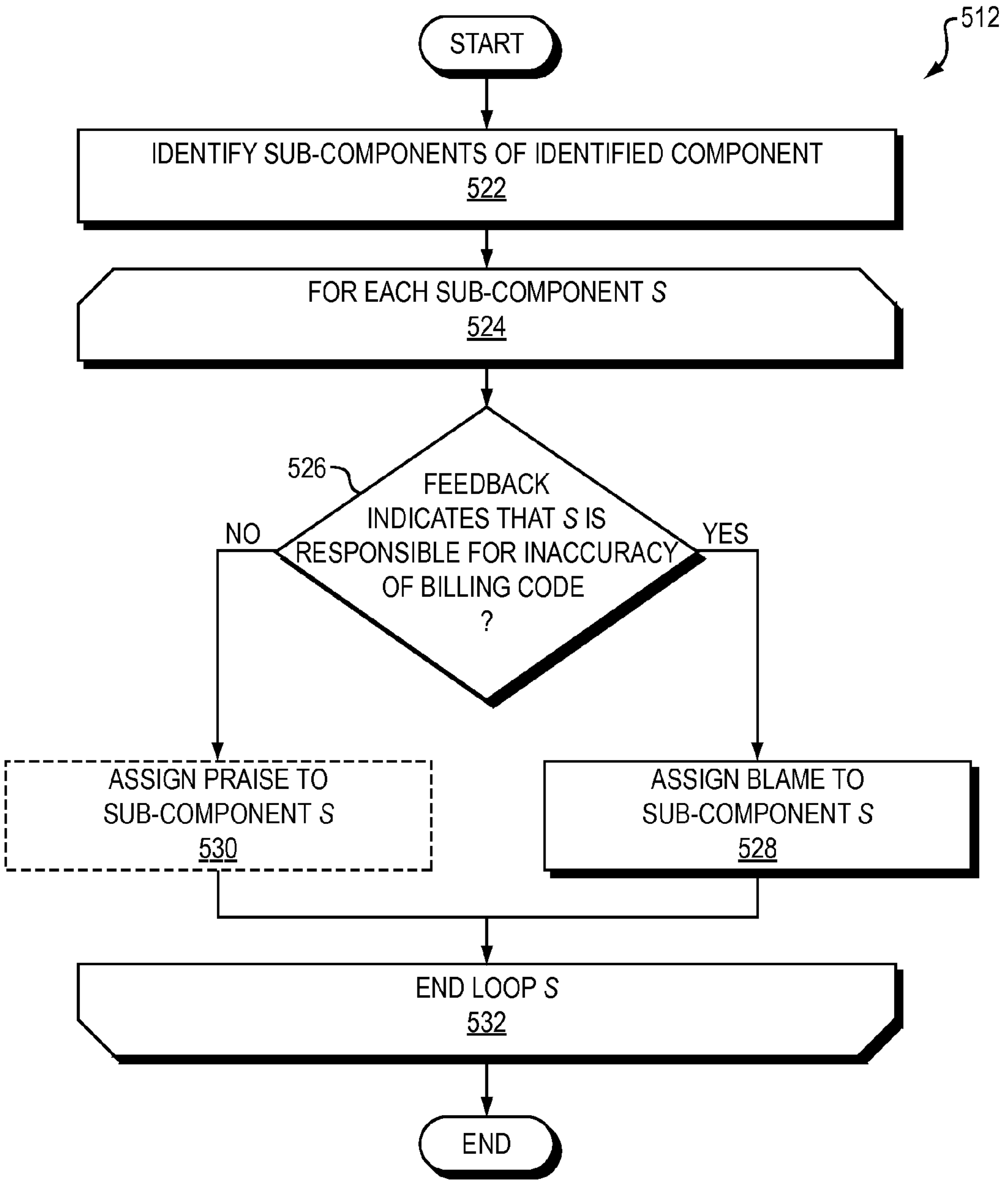
FIGS. 5B-5C are flowcharts of methods for implementing particular operations of the method of FIG. 5A according to one embodiment of the present invention.

Some embodiments of the present invention, therefore, distinguish between the responsibilities of sub-components within a component. For example, referring to FIG. 5B, a flowchart is shown of a method that is performed in one embodiment of the present invention to implement operation 512 of FIG. 5A (associating blame with a component that was responsible for generating the billing code on which feedback 408 was provided by the reviewer 406). The method 512 identifies all sub-components of the component identified in operation 506 (FIG. 5B, operation 522). Then, for each such sub-component S (FIG. 5B, operation 524), the method 512 determines whether the reviewer's feedback 408 indicates that sub-component S is responsible for the inaccuracy of the billing code (FIG. 5B, operation 526). If sub-component S is determined to be responsible, then method 512 assigns blame to sub-component S in any of the ways described above (FIG. 5B, operation 528).

If sub-component S is not determined to be responsible, then method 512 may either assign praise to sub-component S in any of the ways described above (FIG. 5B, operation 530) or take no action in connection with sub-component S. The method 512 repeats the operations described above for the remaining sub-components (FIG. 5B, operation 532). One consequence of the methods of FIGS. 5A and 5B is that the feedback module 410 may apply reinforcement to one sub-component of a component but not to another sub-component of the component, and that the feedback module 410 may apply one type of reinforcement (e.g., praise) to one sub-component of a component and another type of reinforcement (e.g., blame) to another sub-component of the component.

Figure 5C:
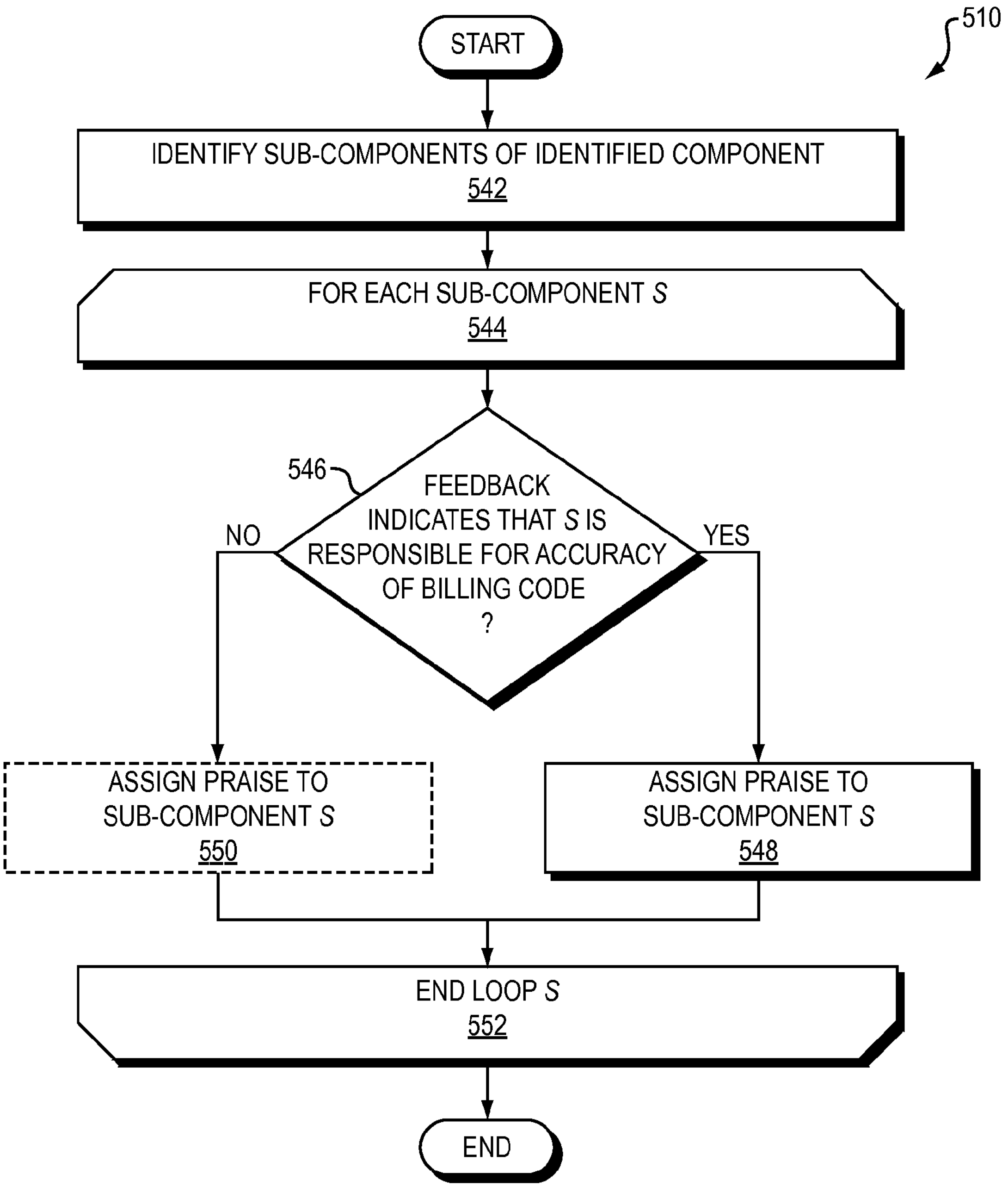

Similar techniques may be applied to assign praise to sub-components of a particular component. For example, referring to FIG. 5C, a flowchart is shown of a method that is performed in one embodiment of the present invention to implement operation 510 of FIG. 5A (associating praise with a component that was responsible for generating the billing code on which feedback 408 was provided by the reviewer 406). The method 510 identifies all sub-components of the component identified in operation 506 (FIG. 5C, operation 542). Then, for each such sub-component S (FIG. 5C, operation 544), the method 510 determines whether the reviewer's feedback 408 indicates that sub-component S is responsible for the accuracy of the billing code (FIG. 5C, operation 546). If sub-component S is determined to be responsible, then method 510 assigns praise to sub-component S in any of the ways described above (FIG. 5C, operation 548).

If sub-component S is not determined to be responsible, then method 510 may either assign blame to sub-component S in any of the ways described above (FIG. 5C, operation 550) or take no action in connection with sub-component S. The method 510 repeats the operations described above for the remaining sub-components (FIG. 5C, operation 552).

The billing code feedback module 410 may implement either or both of the methods shown in FIGS. 5B and 5C. In other words, the billing code feedback module 410 may assign blame on a sub-component basis (and optionally also on a component basis) but only assign praise on a component basis. As another example, the billing code feedback module 410 may assign praise on a sub-component basis (and optionally also on a component basis) but only assign blame on a component basis. As yet another example, the billing code feedback module 410 may assign blame on a sub-component basis (and optionally also on a component basis) and also assign praise on a sub-component basis (and optionally also on a component basis). As yet another example, the billing code feedback module 410 may assign blame only on a component basis and assign praise only on a component basis.

Figure 6:
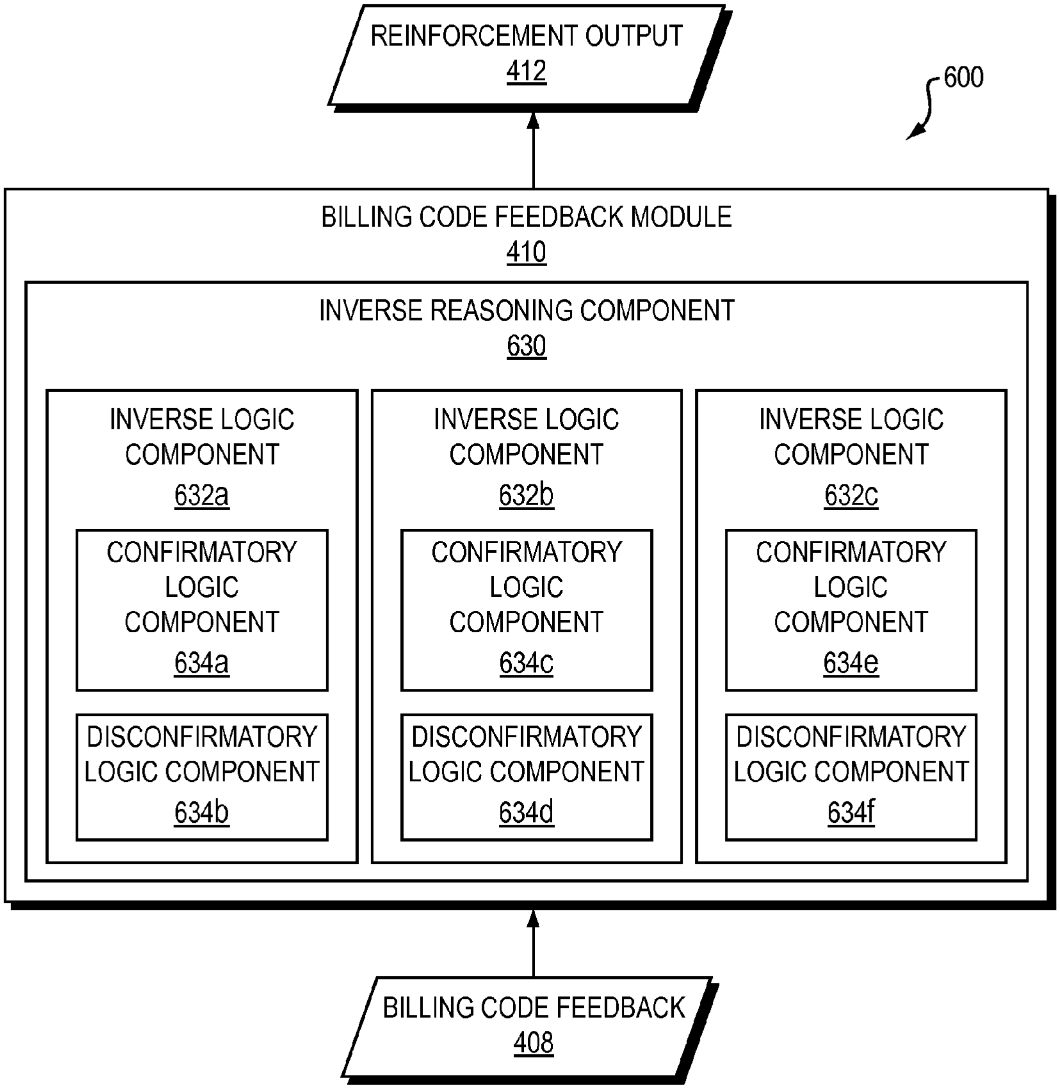
FIG. 6 is a dataflow diagram of a system for using inverse reasoning to identify components of a system that were responsible for generating billing codes according to one embodiment of the present invention.

The billing code feedback module 410 may use any of a variety of techniques to determine (e.g., in operations 526 of FIG. 5B and 548 of FIG. 5C) whether the billing code feedback 408 indicates that a particular sub-component S is responsible for the accuracy or inaccuracy of a particular billing code. For example, referring to FIG. 6, a dataflow diagram is shown of a system 600 in which billing code feedback module 410 uses an inverse reasoning module 630 to implement identify responsible components.

Inverse reasoning module 630 includes inverse logic components 632*a-c*, each of which may be implemented in any of the ways disclosed above in connection with forward logic components 132*a-c* of reasoning module 130 (FIG. 1A). Each of the inverse logic components 632*a-c* may implement distinct logic for reasoning backwards over the set of logic (e.g., set of rules) represented and implemented by the reasoning module 130 as a whole. The set of logic represented and implemented by the reasoning module 130 as a whole will be referred to herein as the "rule set" of the reasoning module 130, although it should be understood more generally that the reasoning module 130 may implement logic in addition to or other than rules, and that the term "rule set" refers generally herein to any such logic.

Inverse logic component 632*a* may implement first logic for reasoning backwards over the rule set of reasoning module 130, inverse logic component 632*b* may implement second logic for reasoning backwards over the rule set of reasoning module 130, and inverse logic component 632*c* may implement third logic for reasoning backwards over the rule set of reasoning module 130.

For example, each of the inverse logic components 632*a-c* may contain both a confirmatory logic component and a disconfirmatory logic component, both of which may be implemented in any of the ways disclosed above in connection with forward logic components 132*a-c* of reasoning module 130 (FIG. 1A). More specifically, inverse logic component 632*a* contains confirmatory logic component 634*a* and disconfirmatory logic component 634*b*; inverse logic component 632*b* contains confirmatory logic component 634*c* and disconfirmatory logic component 634*d*; and inverse logic component 632*c* contains confirmatory logic component 634*e* and disconfirmatory logic component 634*f*.

The billing code feedback module 410 may use a confirmatory logic component to invert the logic of the rule set of reasoning module 130 if the feedback 408 confirms the accuracy of the reviewed billing code (i.e., if the feedback 408 indicates that the reviewed billing code is accurate). In other words, a confirmatory logic component specifies a conclusion that may be drawn from: (1) the rule set of reasoning module 130; (2) the propositions 160; (3) the billing code under review; and (4) feedback indicating that a reviewed billing code is accurate. Such a conclusion may, for example, be that the premise (i.e., condition) of the logic represented by a particular forward logic component in the rule set of the reasoning module 130 is valid (accurate), or that no conclusion can be drawn about the validity of the premise.

Conversely, the billing code feedback module 410 may use a disconfirmatory logic component to invert the logic of the rule set of reasoning module 130 if the feedback 408 disconfirms the accuracy of the reviewed billing code (i.e., if the feedback 408 indicates that the reviewed billing code is inaccurate). In other words, a disconfirmatory logic component specifies a conclusion that may be drawn from: (1) the rule set of reasoning module 130; (2) the propositions 160; (3) the billing code under review; and (4) feedback indicating that a reviewed billing code is inaccurate. Such a conclusion may, for example, be that the premise (i.e., condition) of the logic represented by a particular forward logic component in the rule set of the reasoning module 130 is invalid (inaccurate), or that no conclusion can be drawn about the validity of the premise.

Consider a simple example in which forward logic component 132*a* represents logic of the following form: "If A, Then B." The reasoning module 130 may apply such a rule to mean, "if concept A is represented by the data source (e.g., draft transcript 106), then add a billing code representing concept B to the billing codes 140." Assuming that inverse logic component 632*a* corresponds to forward logic component 132*a*, the confirmatory logic component 634*a* and disconfirmatory logic components 634*b* of inverse logic component 632*a* may represent the logic indicated by Table 2.

TABLE 2

| Inverse Logic Type | Conditions | Conclusion |
|---|---|---|
| Confirmatory | (If A, Then B)<br>B Confirmed | A is accurate |
| Disconfirmatory | (If A, Then B)<br>B Disconfirmed | A is inaccurate |

As indicated by Table 2, the confirmatory logic component 634*a* may represent logic indicating that the combination of: (1) the rule "If A, Then B"; and (2) feedback indicating that B is true (e.g., that a billing code representing B has been confirmed to be accurate) justifies the conclusion that (3) A is true (e.g., that the code representing A is accurate). Such a conclusion may be justified if it is also known that the rule set of reasoning module 130 contains no logic, other than the rule "If A, Then B," for generating B. Confirmatory logic component 634*a* may, therefore, draw the conclusion that A is accurate by applying inverse reasoning to the rule set of the reasoning module 130 (including rules other than the rule "If A, Then B" which generated B), based on feedback indicating that B is true. In this case, the billing code feedback module 410 may assign praise to the component(s) that generated the billing code representing B. If confirmatory logic component 634*a* cannot determine that "If A, Then B" is the only rule in the rule set of the reasoning module 130 that can generate B, then the confirmatory logic module may assign neither praise nor blame to the component(s) that generated the billing code representing B.

Now consider the disconfirmatory logic component 634*b* of inverse logic component 632*a*. As indicated by Table 2, disconfirmatory logic component 634*b* may, for example, represent logic indicating that the combination of: (1) the rule "If A, Then B"; and (2) disconfirmation of B justifies the conclusion that (3) A is false (e.g., that the code representing concept A is inaccurate). In this case, the billing code feedback module 410 may assign blame to the component(s) that generated the billing code representing concept B (e.g., the component(s) that generated the concept code representing concept A).

The techniques disclosed above may be used to identify components responsible for generating a billing code without using all of the various links 124*a-c*, 134*a-c*, and 144*a-c* shown in FIG. 1A. In particular, consider again a rule of the form "If A, Then B." Assume that one of the concept extraction components 120*a* is solely responsible for generating concept codes representing instances of concept A (i.e., that none of the other concept extraction components 120*b-c* generates concept codes representing instances of concept A). In this case, if the billing code feedback module 410 concludes, based on the rule "If A, Then B" and feedback provided on a billing code representing concept B, that reinforcement (praise or blame) should be assigned to the concept extraction component responsible for generating the concept code representing concept A, the billing code feedback module 410 may identify the appropriate concept extraction component 120*a* by matching the concept A from the rule "If A, Then B" with the concept A corresponding to concept extraction component 120*a*. In other words, the billing code feedback module 410 may identify the responsible concept extraction component 120*a* on the fly (i.e., during performance of operation 506 in FIG. 5A), without needing to create, store, or read from any record of the concept extraction component that actually generated the concept code representing concept A.

The inverse reasoning module 630 may, alternatively or additionally, use inverse logic components 632*a-c* to identify sub-components that are and are not responsible for the accuracy or inaccuracy of a reviewed billing code, and thereby to enable operations 526 (FIG. 5B) and 546 (FIG. 5C). For example, assume that forward logic component 132*a* represents a rule of the form "If (A AND B), Then C." The forward reasoning module 130 may apply such a rule to mean, "if concept A and concept B are represented by the data source (e.g., draft transcript 106), then add a billing code representing concept C to the billing codes 140." The confirmatory logic component 634*a* and disconfirmatory logic component 634*b* of inverse logic component 632*a* may represent the logic indicated by Table 3.

TABLE 3

| Inverse Logic Type | Conditions | Conclusion |
|---|---|---|
| Confirmatory | If (A AND B), Then C<br>C Confirmed | A is accurate and B is accurate |
| Disconfirmatory | If (A AND B), Then C<br>C Disconfirmed | A is inaccurate, B is inaccurate, or both A and B are inaccurate |

As indicated by Table 3, confirmatory logic component 634*a* may, for example, represent logic indicating that if the rule "If (A AND B), Then C" is inverted based on feedback indicating that C is true (e.g., that a billing code representing concept C is accurate), then it can be concluded that A is true (e.g., that the concept code representing concept A and relied upon by the rule is accurate) and that B is true (e.g., that the concept code representing concept B and relied upon by the rule is accurate), if no other rule in the rule set of the reasoning module 130 can generate C. In this case, the billing code feedback module 410 may assign praise to the component(s) that generated the code representing concept A and to the component(s) that generated the code representing concept B.

As indicated by Table 3, disconfirmatory logic component 634*b* may, for example, represent logic indicating if the rule "If (A AND B), Then C" is inverted based on feedback indicating that C is false (e.g., that a billing code representing concept C is inaccurate), then either A is false, B is false, or both A and B are false. In this case, the billing code feedback module 410 may assign blame to both the component(s) responsible for generating A and the component(s) responsible for generating B. For example, the billing code feedback module 410 may divide the blame evenly, such as by assigning 50% of the blame to the component responsible for generating concept A and 50% of the blame to the component responsible for generating concept B.

Although such a technique may result in assigning blame to a component that does not deserve such blame in a specific case, as the billing feedback module 410 assigns blame and praise to the same component repeatedly over time, and to a variety of components in the systems 100*a-b* over time, the resulting reliability scores associated with the various components is likely to reflect the actual reliabilities of such components. Therefore, one advantage of embodiments of the present invention is that they are capable of assigning praise and blame to components with increasing accuracy over time, even while assigning praise and blame inaccurately in certain individual cases.

Alternatively, for example, if it is not immediately possible to assign any praise or blame to the components responsible for generating codes A or B, the billing code feedback module 410 may associate and store a truth value of "false" with the rule "If (A AND B), Then C" (e.g., with the forward logic component representing that rule). As described in more detail below, this truth value may be used to draw inferences about the truth values of A and/or B individually.

Now assume that forward logic component 132*a* represents a rule of the form "If (A OR B), Then C." The forward reasoning module 130 may apply such a rule to mean, "if concept A is represented by the data source (e.g., draft transcript 106) or concept B is represented by the data source, then add a billing code representing concept C to the billing codes 140." The confirmatory logic component 634*a* and disconfirmatory logic components 634*b* of inverse logic component 632*a* may represent the logic indicated by Table 4.

TABLE 4

| Inverse Logic Type | Conditions | Conclusion |
|---|---|---|
| Confirmatory | If (A OR B), Then C<br>C Confirmed | A is accurate, B is accurate, or both A and B are accurate |
| Disconfirmatory | If (A OR B), Then C<br>C Disconfirmed | A is inaccurate and B is inaccurate |

As indicated by Table 4, confirmatory logic component 634*b* may, for example, represent logic indicating if the rule "If (A AND B), Then C" is inverted based on feedback indicating that C is true (e.g., that a billing code representing concept C is accurate), then either A is true, B is true, or both A and B are true. In this case, the billing code feedback module 410 may assign praise to both the component(s) responsible for generating A and the component(s) responsible for generating B. For example, the billing code feedback module 410 may divide the praise evenly, such as by assigning 50% of the praise to the component responsible for generating concept A and 50% of the praise to the component responsible for generating concept B.

Alternatively, for example, if it is not immediately possible to assign any praise or blame to the components responsible for generating codes A or B, the billing code feedback module 410 may associate and store a truth value of "true" with the rule "If (A OR B), Then C" (e.g., with the forward logic component representing that rule). As described in more detail below, this truth value may be used to draw inferences about the truth values of A and/or B individually.

As indicated by Table 4, disconfirmatory logic component 634*b* may, for example, represent logic indicating if the rule "If (A OR B), Then C" is inverted based on feedback indicating that C is false (e.g., that a billing code representing concept C is inaccurate), then A must be false and B must be false. In this case, the billing code feedback module may assign blame to both the component(s) responsible for generating the code representing concept A and the component(s) responsible for generating the code representing concept B.

The particular inversion logic described above is merely illustrative and does not constitute a limitation of the present invention. Those having ordinary skill in the art will appreciate that other inversion logic will be applicable to logic having forms other than those specifically listed above.

The feedback provided by the reviewer 406 may include, in addition to or instead of an indication of whether the reviewed billing code is accurate, a revision to the reviewed billing code. For example, the reviewer 406 may indicate, via the feedback 408, a replacement billing code. In response to receiving such a replacement billing code, the billing code feedback module 410 may replace the reviewed billing code with the replacement billing code. The reviewer 406 may specify the replacement billing code, such as by typing the text of such a code, selecting the code from a list, or using any user interface to select a description of the replacement billing code, in response to which the billing code feedback module 410 may select the replacement billing code and use it to replace the reviewed billing code in the data source.

For example, referring again to Table 1, assume that the forward reasoning module 130 had used Rule #2 to generate billing code 142*b* representing "<UNCONTROLLED_DIABETES>," and that the reviewer 406 has provided feedback 408 indicating that "<UNCONTROLLED_DIABETES>" should be replaced with "<DIABETES_NOT_FURTHER_SPECIFIED>." In response, the billing code feedback module 410 may replace the code "<UNCONTROLLED_DIABETES>" with the code "<DIABETES_NOT_FURTHER_SPECIFIED>" in the draft transcript 106.

More generally, the billing code feedback module 410 may treat the receipt of such a replacement billing code as: (1) disconfirmation by the reviewer 406 of the reviewed billing code (i.e., the billing code replaced by the reviewer 406, which in this example is "<UNCONTROLLED_DIABETES>"); and (2) confirmation by the reviewer 406 of the replacement billing code (which in this example is "<DIABETES_NOT_FURTHER_SPECIFIED>"). In other words, a single feedback input provided by the reviewer 406 may be treated by the billing code feedback module 410 as a disconfirmation of one billing code and a confirmation of another billing code. In response, the feedback module 410 may: (1) take any of the steps described above in response to a disconfirmation of a billing code in connection with the reviewed billing code that has effectively been disconfirmed by the reviewer 406; and (2) take any of the steps described above in response to a confirmation of a billing code in connection with the reviewed billing code that has effectively been confirmed by the reviewer 406.

As described above, reviewer feedback 408 may cause the feedback module 410 to associate truth values with particular forward logic components (e.g., rules). The feedback module 410 may use such truth values to automatically confirm or disconfirm individual forward logic components and/or subcomponents thereof. In general, the feedback module 410 may follow any available chains of logic represented by the forward logic components 132*a-c* and their associated truth values at any given time, and draw any conclusions justified by such chains of logic.

As a result, the feedback module 410 may confirm or disconfirm the accuracy of a component of the system 100*a*, even if such a component was not directly confirmed or disconfirmed by the reviewer's feedback 408. For example, the reviewer 406 may provide feedback 408 on a billing code that disconfirms a first component (e.g., forward logic component) of the system 100*a*. Such disconfirmation may cause the feedback module to confirm or disconfirm a second component (e.g., forward logic component) of the system 100*a*, even if the second component was not responsible for generating the billing code on which feedback 408 was provided by the reviewer 406. Automatic confirmation/disconfirmation of a system component by the feedback module 410 may include taking any of the actions disclosed herein in connection with manual confirmation/disconfirmation of a system component. The feedback module 410 may follow chains of logic through any number of components of the system 100*a* in this way.

As described above, the term "component" as used herein includes one or more sub-components of a component. Therefore, for example, if the reviewer's feedback 408 disconfirms the reviewed billing code, this may cause the feedback module 410 to disconfirm a first sub-component (e.g., condition) of a first one of the forward logic components 142*a-c*, which may in turn cause the feedback module 410 to confirm a sub-component (e.g., condition) of a second one of the forward logic components 142*a-c*, which may in turn cause the feedback module 410 to disconfirm (and thereby to assign blame to) a second sub-component of the first one of the forward logic components 142*a-c*.

As a particular example, consider again the case in which the reviewer's feedback 408 replaces the billing code "<UNCONTROLLED_DIABETES>" generated by Rule #2 of Table 1 with the billing code "<DIABETES_NOT_FURTHER_SPECIFIED>". In response, the feedback module 410 may assign a truth value of "false" (i.e., disconfirm) Rule #2, but not yet determine which sub-component (e.g., the clause "patient_has_problem<DIABETES>" or the clause "p.getStatus( )==<UNCONTROLLED>") is to blame for the disconfirmation of the rule as a whole.

Since the user has now also confirmed the billing code "<DIABETES_NOT_FURTHER_SPECIFIED>," the feedback module 410 may use the inverse reasoning of inverse reasoning module 630 to automatically confirm Rule #1 of Table 1 and to assign a truth value of "true" (i.e., confirm) to Rule #1. Now that Rule #1 has been confirmed, it is known that the clause "patient_has_problem<DIABETES>" is true (confirmed). It is also known, as described above, that the truth value of Rule #2 is false. Therefore, the feedback module 410 may apply the logic "If (A AND B) AND (NOT A), Then (NOT B)" to Rule #2 to conclude that "p.get Status( )==<UNCONTROLLED>" is false (where A is "patient_has_problem<DIABETES>" and where B is "p.getStatus( )==<UNCONTROLLED>"). The feedback module 410 may, in response to drawing this conclusion, associate blame with the component(s) responsible for generating the code "<UNCONTROLLED>."

Assigning blame and praise to components responsible for generating codes enables the system 400 to independently track the accuracy of constituent components (e.g., clauses) in the forward reasoning module 130 (e.g., rule set), and thereby to identify components of the system 100*a* that are not reliable at generating concept codes and/or billing codes. The feedback module 410 may take any of a variety of actions in response to determining that a particular component is unreliable. More generally, the feedback module 410 may take any of a variety of actions based on the reliability of a component, as may be represented by the reliability score of the component (FIG. 5A, operation 514).

The feedback module 410 may consider a particular component to be "unreliable" if, for example, the component has a reliability score falling below (or above) some predetermined threshold. For example, a component may be considered "unreliable" if the component has generated concept codes that have been disconfirmed more than a predetermined minimum number of times. For purposes of determining whether a component is unreliable, the feedback module 410 may take into account only manual disconfirmations by human reviewers, or both manual disconfirmations and automatic disconfirmations resulting from application of chains of logic by the feedback module 410.

The system 400 may take any of a variety of actions in response to concluding that a component is unreliable. For example, the system 100*a* may subsequently and automatically require the human operator 406 to review and approve of any concept codes (subsequently and/or previously) generated by the unreliable concept extraction component, while allowing codes (subsequently and/or previously) generated by other concept extraction components to be used without requiring human review. For example, if a particular concept extraction component is deemed by the feedback module 410 to be unreliable, then when the particular concept extraction component next generates a concept code, the system 100*a* may require the human reviewer to review and provide input indicating whether the reviewer approves of the generated concept code. The system 100*a* may insert the generated concept code into the draft transcript 106 in response to input indicating that the reviewer 406 approves of the generated concept code, and not insert the generated concept code into the draft transcript 106 in response to input indicating that the reviewer 406 does not approve of the generated concept code.

Additionally or alternatively, the system 100*a* may subsequently and automatically require the human operator 406 to review and approve of any billing codes (subsequently and/or previously) generated based on concept codes generated by the unreliable concept extraction component, while allowing billing codes (subsequently and/or previously) generated without reliance on the unreliable concept extraction component to be used without requiring human review. For example, if a particular concept extraction component is deemed by the feedback module 410 to be unreliable, then when any of the forward logic components 132*a-c* next generates a concept code based on logic that references the concept code (e.g., a condition which requires the data source to contain a concept code generated by the unreliable concept extraction component), the system 100*a* may require the human reviewer to review and provide input indicating whether the reviewer approves of the generated billing code and/or concept code. The system 100*a* may insert the generated billing code into the draft transcript 106 in response to input indicating that the reviewer 406 approves of the generated billing code and/or concept code, and not insert the generated billing code into the draft transcript 106 in response to input indicating that the reviewer 406 does not approve of the generated billing code and/or concept code.

As another example, in response to concluding that a particular concept extraction component is unreliable, the system 400 may notify the human reviewer 406 of such insufficient reliability, in response to which the human reviewer 406 or other person may modify (e.g., by reprogramming) the identified concept extraction component in an attempt to improve its reliability.

Although certain examples described above refer to applying reinforcement (i.e., assigning praise and/or blame) to components of systems 100*a-b*, embodiments of the present invention may also be used to apply reinforcement to one or more human reviewers 406 who provide feedback on the billing codes 140. For example, the system 400 may associate a reliability score with the human reviewer 406, and associate distinct reliability scores with each of one or more additional human reviewers (not shown) who provide feedback to the system 400 in the same manner as that described above in connection with the reviewer 406.

As described above in connection with FIGS. 4 and 5A, the billing code feedback module 410 may solicit feedback 408 from the human reviewer 406 in connection with a particular one of the billing codes 142*a-c*. The billing code feedback module 410 may further identify a reference reliability score associated with the billing code under review. Such a reliability score may, for example, be implemented in any of the ways disclosed herein, and may therefore, for example, have a value of "accurate" or "inaccurate" or any value representing an intermediate verification status. The billing code feedback module 410 may identify the reference reliability score of the billing code in any manner, such as by initially associated a default reliability score with the billing code (e.g., 0.0, 1.0, or 0.5) and then revising the reference reliability score in response to feedback 408 provided by the reviewer 406 and other reviewers over time on the billing code.

As a result, as many reviewers provide feedback on a plurality of billing codes, the system 400 may refine the reliability scores that are associated with concept extraction components 120*a-c* over time. The billing code feedback module 410 may use such a refined reliability score for a billing code as the reference reliability score for the billing code in the process described below. The billing code feedback module 410 may, for example, first wait until the billing code's reliability score achieves some predetermined degree of confirmation, such as by waiting until some minimum predetermined amount of feedback has been provided on the billing code, or until some minimum predetermined number of reviewers have provided feedback on the billing code.

As reviewers (such as reviewer 406 and other reviewers) continue to provided feedback to the billing code feedback module 410 in connection with the billing code, the billing code feedback module may determine whether the feedback provided by the human reviewers, individually or in aggregate, diverges from the reliability scores (e.g., the sufficiently-confirmed reliability scores) sufficiently (e.g., by more than some predetermined degree). If the determination indicates that the reviewers' feedback does sufficiently diverge from the reference reliability score, then the billing code feedback module 410 may take any of a variety of actions, such as one or more of the following: (1) assigning blame to one or more of the human reviewers who provided the diverging feedback; and (2) prevent any blame resulting from the diverging feedback from propagating backwards through the systems 100*a-b* to the corresponding components (e.g., concept extraction components 120*a-c* and/or forward logic components 132*a-c*). Performing both (1) and (2) is an example in which the system 400 assigns blame to one component of the system (the human reviewer 406) but does not propagate such blame backwards up to any of the system components.

The billing code feedback module may apply the same techniques to any number of human reviewers 406 to modify the distinct reliability scores associated with such reviewers over time based on the feedback they provide. Such a method in effect treats the human reviewer 406 as the first component in the chain of inverse logic implemented by the inverse reasoning component 630.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Although certain examples herein involve "billing codes," such examples are not limitations of the present invention. More generally, embodiments of the present invention may be applied in connection with codes other than billing codes, and in connection with data structures other than codes, such as data stored in databases and in forms other than structured documents.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions tangibly stored on at least one non-transitory computer-readable medium, the method for use with a system including a data source and a first billing code, the method comprising using the at least one computer processor to perform operations of:

(A) receiving input from a user, wherein the input represents a verification status of the first billing code;

(B) applying first inverse logic to the input, the billing code, and a set of forward logic, to identify first and second concept extraction components, wherein (B) comprises:

(B)(1) identifying a first logic component that generated the first billing code, wherein the first logic component comprises means for implementing first logic, wherein the first logic includes a first condition, wherein the first condition includes a first sub-condition and a second sub-condition; and (B)(2) applying first inverse logic to the input received from the user to identify at least one of the first and second sub-conditions; and (C) applying reinforcement to the first and second concept extraction components, comprising:

(B)(1) determining whether the verification status indicates that the first billing code is accurate;

(B)(2) if the verification status indicates that the first billing code is inaccurate, then applying negative reinforcement to the first and second concept extraction components, comprising apportioning the negative reinforcement between the first and second concept extraction components.

2. The method of claim 1, wherein (C) further comprises:

(B)(3) if the verification status does not indicate that the first billing code is inaccurate, then applying positive reinforcement to the first and second concept extraction components, comprising apportioning the positive reinforcement to the first and second concept extraction components.

3. The method of claim 1, further comprising:

(D) determining whether the first concept extraction component is unreliable at generating concept codes; and (E) if the first concept extraction component is determined to be unreliable at generating concept codes, then:

(B)(1) at the first concept extraction component, generating a concept code; and (B)(2) requiring human review of the concept code before adding the concept code to the data source.

4. The method of claim 1, further comprising:

(D) determining whether the first concept extraction component is unreliable at generating concept codes; and (E) if the first concept extraction component is determined to be unreliable at generating concept codes, then:

(E)(1) at the identified concept extraction component, generating a concept code;

(E)(2) at a logic component in the system, generating a second billing code based on the concept code; and (E)(3) requiring human review of the second billing code before adding the billing code to the system.

5. The method of claim 1, wherein (B) comprises:

(B)(1) determining that the first concept extraction component includes means for generating concept codes representing instances of a first concept;

(B)(2) determining that the first billing code was generated by a first logic component in reliance on a concept code representing an instance of the first concept;

(B)(3) identifying the first concept extraction component based on the determination that the first billing code was generated by the first logic component.

6. The method of claim 1, wherein a first reliability score is associated with the first concept extraction component, wherein the first reliability score represents an estimate of a first degree to which the first concept extraction component generates concept codes accurately, and wherein applying the negative reinforcement comprises associating a second reliability score with the first concept extraction component, wherein the second reliability score represents an estimate of a second degree to which the first concept extraction component generates concept codes accurately, wherein the second degree is lower than the first degree.

7. The method of claim 1, wherein (B) comprises:

(B)(1) identifying a first logic component that generated the first billing code;

(B)(2) identifying, based on the input from the user, a concept relied upon by the first logic component to generate the first billing code; and (B)(3) identifying the first concept extraction component based upon the concept relied upon by the first logic component.

8. The method of claim 7, wherein (B)(3) comprises identifying the first concept extraction component by determining that the first concept extraction component generates concept codes representing instances of the concept relied upon by the first logic component.

9. The method of claim 1, wherein (B)(2) comprises identifying exactly one of the first and second sub-conditions, and wherein (B) further comprises:

(B)(1) identifying a first concept that satisfies the identified one of the first and second sub-conditions; and (B)(2) identifying a concept extraction component comprising means for generating concept codes representing instances of the first concept.

10. The method of claim 1, wherein (B)(2) comprises identifying both of the first and second sub-conditions.

11. A non-transitory computer-readable medium comprising computer-readable instructions tangibly stored on the computer-readable medium, wherein the instructions are executable by at least one computer processor to perform a method for use with a system including a data source and a first billing code, the method comprising:

(A) receiving input from a user, wherein the input represents a verification status of the first billing code;

(B) applying first inverse logic to the input, the billing code, and a set of forward logic, to identify first and second concept extraction components, wherein (B) comprises:

(B)(1) identifying a first logic component that generated the first billing code, wherein the first logic component comprises means for implementing first logic, wherein the first logic includes a first condition, wherein the first condition includes a first sub-condition and a second sub-condition; and (B)(2) applying first inverse logic to the input received from the user to identify at least one of the first and second sub-conditions; and (C) applying reinforcement to the first and second concept extraction components, comprising:

(B)(1) determining whether the verification status indicates that the first billing code is accurate;

(B)(2) if the verification status indicates that the first billing code is inaccurate, then applying negative reinforcement to the first and second concept extraction components, comprising apportioning the negative reinforcement between the first and second concept extraction components.

12. The computer-readable medium of claim 11, wherein (C) further comprises:

(B)(3) if the verification status does not indicate that the first billing code is inaccurate, then applying positive reinforcement to the first and second concept extraction components, comprising apportioning the positive reinforcement to the first and second concept extraction components.

13. The computer-readable medium of claim 11, further comprising:

(D) determining whether the first concept extraction component is unreliable at generating concept codes; and (E) if the first concept extraction component is determined to be unreliable at generating concept codes, then:

(B)(1) at the first concept extraction component, generating a concept code; and (B)(2) requiring human review of the concept code before adding the concept code to the data source.

14. The computer-readable medium of claim 11, further comprising:

(F) determining whether the first concept extraction component is unreliable at generating concept codes; and (G) if the first concept extraction component is determined to be unreliable at generating concept codes, then:

(E)(4) at the identified concept extraction component, generating a concept code;

(E)(5) at a logic component in the system, generating a second billing code based on the concept code; and (E)(6) requiring human review of the second billing code before adding the billing code to the system.

15. The computer-readable medium of claim 11, wherein (B) comprises:

(B)(4) determining that the first concept extraction component includes means for generating concept codes representing instances of a first concept;

(B)(5) determining that the first billing code was generated by a first logic component in reliance on a concept code representing an instance of the first concept;

(B)(6) identifying the first concept extraction component based on the determination that the first billing code was generated by the first logic component.

16. The computer-readable medium of claim 11, wherein a first reliability score is associated with the first concept extraction component, wherein the first reliability score represents an estimate of a first degree to which the first concept extraction component generates concept codes accurately, and wherein applying the negative reinforcement comprises associating a second reliability score with the first concept extraction component, wherein the second reliability score represents an estimate of a second degree to which the first concept extraction component generates concept codes accurately, wherein the second degree is lower than the first degree.

17. The computer-readable medium of claim 11, wherein (B) comprises:

(B)(4) identifying a first logic component that generated the first billing code;

(B)(5) identifying, based on the input from the user, a concept relied upon by the first logic component to generate the first billing code; and (B)(6) identifying the first concept extraction component based upon the concept relied upon by the first logic component.

18. The computer-readable medium of claim 17, wherein (B)(3) comprises identifying the first concept extraction component by determining that the first concept extraction component generates concept codes representing instances of the concept relied upon by the first logic component.

19. The computer-readable medium of claim 11, wherein (B)(2) comprises identifying exactly one of the first and second sub-conditions, and wherein (B) further comprises:

(B)(3) identifying a first concept that satisfies the identified one of the first and second sub-conditions; and (B)(4) identifying a concept extraction component comprising means for generating concept codes representing instances of the first concept.

20. The computer-readable medium of claim 11, wherein (B)(2) comprises identifying both of the first and second sub-conditions.

* * * * *

UNITED STATES PATENT AND TRADEMARK OFFICE

CERTIFICATE OF CORRECTION

PATENT NO. : 8,463,673 B2
APPLICATION NO. : 13/242532
DATED : June 11, 2013
INVENTOR(S) : Detlef Koll et al.

It is certified that error appears in the above-identified patent and that said Letters Patent is hereby corrected as shown below:

In the Claims:

In column 28, line 6, delete “(B)(1)” and insert -- (C)(1) --, therefor.

In column 28, line 8, delete “(B)(2)” and insert -- (C)(2) --, therefor.

In column 28, line 15, delete “(B)(3)” and insert -- (C)(3) --, therefor.

In column 28, line 27, delete “(B)(1)” and insert -- (E)(1) --, therefor.

In column 28, line 29, delete “(B)(2)” and insert -- (E)(2) --, therefor.

In column 29, line 15, delete “(B)(1)” and insert -- (B)(3) --, therefor.

In column 29, line 17, delete “(B)(2)” and insert -- (B)(4) --, therefor.

In column 29, line 44, delete “(B)(1)” and insert -- (C)(1) --, therefor.

In column 29, line 46, delete “(B)(2)” and insert -- (C)(2) --, therefor.

In column 29, line 54, delete “(B)(3)” and insert -- (C)(3) --, therefor.

In column 29, line 66, delete “(B)(1)” and insert -- (E)(1) --, therefor.

In column 30, line 1, delete “(B)(2)” and insert -- (E)(2) --, therefor.

In column 30, line 5, delete “(F)” and insert -- (D) --, therefor.

In column 30, line 7, delete “(G)” and insert -- (E) --, therefor.

In column 30, line 9, delete “(E)(4)” and insert -- (G)(1) --, therefor.

In column 30, line 11, delete “(E)(5)” and insert -- (G)(2) --, therefor.

In column 30, line 13, delete “(E)(6)” and insert -- (G)(3) --, therefor.

Signed and Sealed this
Nineteenth Day of November, 2013

Teresa Stanek Rea
*Deputy Director of the United States Patent and Trademark Office*

UNITED STATES PATENT AND TRADEMARK OFFICE

CERTIFICATE OF CORRECTION

PATENT NO. : 8,463,673 B2
APPLICATION NO. : 13/242532
DATED : June 11, 2013
INVENTOR(S) : Detlef Koll et al.

It is certified that error appears in the above-identified patent and that said Letters Patent is hereby corrected as shown below:

In the Drawings

On sheet 2 of 9, line 1 (Box 106a (Fig. 1B)), delete “TRQANSCRIPT” and insert -- TRANSCRIPT --, therefor.

On sheet 2 of 9, line 1 (Box 106b (Fig. 1B)), delete “TRQANSCRIPT” and insert -- TRANSCRIPT --, therefor.

On sheet 2 of 9, line 1 (Box 106c (Fig. 1B)), delete “TRQANSCRIPT” and insert -- TRANSCRIPT --, therefor.

On sheet 4 of 9, line 1 (Box 304c (Fig. 3)), delete “HYPERSMORALITY” and insert -- HYPEROSMOLARITY --, therefor.

On sheet 4 of 9, line 2 (Box 304c (Fig. 3)), delete “HYPERSMORALITY” and insert -- HYPEROSMOLARITY --, therefor.

In the Specification

In column 11, lines 42-43, delete “hyperosmorality” and insert -- hyperosmolarity --, therefor.

In column 12, line 14, delete “hyperosmorality.” and insert -- hyperosmolarity. --, therefor.

In column 16, line 62, delete “component” and insert -- component. --, therefor.

In column 26, line 17, delete “provided” and insert -- provide --, therefor.

Signed and Sealed this
Seventh Day of October, 2014

Michelle K. Lee

Michelle K. Lee
*Deputy Director of the United States Patent and Trademark Office*